(12) United States Patent
Hara

(10) Patent No.: US 7,472,019 B2
(45) Date of Patent: Dec. 30, 2008

(54) NAVIGATION APPARATUS

(75) Inventor: Satoshi Hara, Kawasaki (JP)

(73) Assignee: Alpine Electronics, Inc., Tokyo (JP)

( * ) Notice: Subject to any disclaimer, the term of this patent is extended or adjusted under 35 U.S.C. 154(b) by 869 days.

(21) Appl. No.: 10/844,964

(22) Filed: May 13, 2004

(65) Prior Publication Data

US 2005/0209773 A1    Sep. 22, 2005

(30) Foreign Application Priority Data

May 15, 2003    (JP) ............................. 2003-137148

(51) Int. Cl.
*G01C 21/00* (2006.01)

(52) U.S. Cl. ...................... 701/201; 701/23; 701/202; 701/207; 701/208; 701/211; 701/213; 340/988; 340/990; 340/995

(58) Field of Classification Search .................. 701/23, 701/201, 202, 207, 208, 209, 211, 213; 340/988, 340/990, 995

See application file for complete search history.

(56) References Cited

U.S. PATENT DOCUMENTS

| | | | | | |
|---|---|---|---|---|---|
| 4,782,447 | A | * | 11/1988 | Ueno et al. | ................. 701/208 |
| 5,291,413 | A | * | 3/1994 | Tamai et al. | ................. 701/210 |
| 5,757,359 | A | * | 5/1998 | Morimoto et al. | ........... 345/156 |
| 5,764,139 | A | * | 6/1998 | Nojima et al. | ............... 340/461 |
| 5,821,880 | A | * | 10/1998 | Morimoto et al. | ...... 340/995.21 |
| 5,991,688 | A | * | 11/1999 | Fukushima et al. | .......... 701/209 |
| 6,038,508 | A | * | 3/2000 | Maekawa et al. | ........... 701/207 |
| 6,121,900 | A | * | 9/2000 | Takishita | ............... 340/995.11 |
| 6,128,571 | A | * | 10/2000 | Ito et al. | ..................... 701/201 |
| 6,240,361 | B1 | * | 5/2001 | Ise et al. | ...................... 701/208 |
| 6,275,231 | B1 | * | 8/2001 | Obradovich | ................. 345/156 |
| 6,317,684 | B1 | * | 11/2001 | Roeseler et al. | ............. 701/202 |
| 6,346,893 | B1 | * | 2/2002 | Hirano et al. | .......... 340/995.23 |
| 6,415,224 | B1 | * | 7/2002 | Wako et al. | ................. 701/208 |
| 2001/0001846 | A1 | * | 5/2001 | Uchigaki | ..................... 701/201 |
| 2001/0029429 | A1 | * | 10/2001 | Katayama et al. | ........... 701/209 |
| 2001/0047241 | A1 | * | 11/2001 | Khavakh et al. | ............. 701/209 |

(Continued)

FOREIGN PATENT DOCUMENTS

DE    199 29 440 A1    12/2000

(Continued)

*Primary Examiner*—Khoi Tran
*Assistant Examiner*—Jorge O Peche
(74) *Attorney, Agent, or Firm*—Brinks Hofer Gilson & Lione

(57) ABSTRACT

In a navigation apparatus, via-point setting data indicating a history in terms of setting of via-points is recorded in a point database. Via-point setting data described in a point record stored in the point database indicates points that were specified as via-points when a point of the point record was specified as a destination in the past. In a setting operation, a list of points registered in advance is displayed. If the user selects a destination from the list, points registered in the via-point setting data in the point record of the point selected as the destination are set as candidates for via-points, and the point names thereof are displayed together with the point name of the destination in a via-point editing area. If an apply button is clicked, the points displayed as the candidates for via-points are determined as via-points, and a route to the destination through the determined via-points is searched for.

16 Claims, 13 Drawing Sheets

U.S. PATENT DOCUMENTS

| | | | |
|---|---|---|---|
| 2002/0128772 A1* | 9/2002 | Polidi et al. | 701/208 |
| 2003/0033080 A1* | 2/2003 | Monde et al. | 701/201 |
| 2003/0229441 A1* | 12/2003 | Pechatnikov et al. | 701/201 |
| 2004/0030493 A1* | 2/2004 | Pechatnikov et al. | 701/208 |
| 2004/0059500 A1* | 3/2004 | Nakano | 701/211 |
| 2005/0004754 A1* | 1/2005 | Hayes | 701/209 |

FOREIGN PATENT DOCUMENTS

| | | |
|---|---|---|
| EP | 0 704 675 A2 * | 3/1996 |
| EP | 0 704 675 A2 | 4/1996 |
| EP | 1 710 539 A1 | 10/2006 |
| JP | 10-160504 | 6/1998 |
| JP | 2000-337914 A1 | 12/2000 |
| JP | 2002-81951 | 3/2002 |
| JP | 2002-81955 | 3/2002 |
| WO | WO 01/01078 A1 | 1/2001 |
| WO | WO 01/046781 A3 | 6/2001 |

* cited by examiner

FIG. 4A

| POINT NUMBER | |
|---|---|
| POINT TYPE | |
| POINT NAME | |
| POINT INFORMATION | |
| POINT LOCATION INFORMATION | |
| VIA-POINT SETTING DATA | |
| POINT NUMBER | |
| POINT NUMBER | |
| ⋮ | |
| POINT NUMBER | |
| RELATED POINT DATA | |
| POINT NUMBER | RELATION LEVEL |
| POINT NUMBER | RELATION LEVEL |
| ⋮ | |
| POINT NUMBER | RELATION LEVEL |

POINT RECORD

FIG. 4B

| POINT NUMBER | |
|---|---|
| POINT TYPE | |
| POINT NAME | |
| POINT INFORMATION | |
| POINT LOCATION INFORMATION | |
| RELATED POINT DATA | |
| POINT NUMBER | RELATION LEVEL |
| POINT NUMBER | RELATION LEVEL |
| ⋮ | |
| POINT NUMBER | RELATION LEVEL |

POINT RECORD

NAVIGATION APPARATUS

BACKGROUND OF THE INVENTION

1. Field of the Invention

The present invention relates to a navigation apparatus for presenting to a user route navigation to a destination.

2. Description of the Related Art

In the art of a navigation apparatus installed in a vehicle, it is known to present to a user route navigation to a destination such that a destination and via-points (way points) specified by coordinates on a map or selected from a list of points registered in advance are accepted, and a route to the accepted destination through the accepted via-points is searched for. A route found by in the searching process is set as a navigation route, and the navigation route is displayed on a map, thereby navigating the vehicle along the route.

One known technique of setting a navigation route in such a navigation apparatus is to register points in a list of points such that when points are set as a destination or via-points by a user, those points are automatically registered in the list of points so that, when setting of points is performed next time or later, the user can easily set a destination or via-points simply by selecting points from the list (an example of such a technique may be found, for example, in Japanese Unexamined Patent Application Publication No. 7-134798).

Another known technique of setting a navigation route in a navigation apparatus is to store routes set as navigation routes so that a user can select a route from the stored routes and set the selected route as a navigation route (an example of such a technique may be found, for example, in Japanese Unexamined Patent Application Publication No. 2002-81955).

Other references relating to the present invention are listed below:

(1) Japanese Unexamined Patent Application Publication No. 7-134798;

(2) Japanese Unexamined Patent Application Publication No. 2002-81955.

In the conventional technique of setting points, when a user sets a destination and via-points in the navigation apparatus, even if the destination and via-points are the same as those set in the past, the user has to perform setting each time the navigation apparatus is used to receive route navigation. This is very inconvenient for the user.

On the other hand, in the conventional technique of storing routes set as navigation routes, a user can select a desired route from the stored routes and set the selected route as a navigation route. Thus, the user can set the same route as any route used in the past, and can receive navigation along the same route. However, in this technique, for example, if a new road has been constructed after the storage of the route, simply setting the same route does not allow the new road to be used. Besides, in the case in which a route is searched taking into account time-varying factors such as traffic congestion, there is a possibility that the best route to a destination passing through via-points is not selected.

SUMMARY OF THE INVENTION

In view of the above, it is an object of the present invention to provide a technique that allows a user to easily set a destination and via-points.

In one aspect, to achieve the above object, the present invention provides a navigation apparatus for, in accordance with a destination and one or more via-points specified by a user, searching for a route to the specified destination through the specified one or more via-points and presenting a detected route, comprising a point database in which one or more combinations of a previously set destination point that is a point specified as a destination in the past by a user and one or more previously set via-points that are points specified as via-points to the previously set destination point are recorded, a destination acceptance unit for accepting a point selected by the user as the destination, and a via-point acceptance unit for accepting one or more via-points such that if the point accepted as the destination by the destination acceptance unit is included as a previously set destination point in a combination recorded in the point database, then one or more previously set via-points included in that combination are accepted as the one or more via-points.

In this navigation apparatus, when a user simply specifies a point as a travel destination this time, via-points used in the past to travel to that destination are presented as candidates for via-points in the current travel or automatically set as via-points.

The destination acceptance unit may include a previously set via-point presentation unit for displaying a previously set via-point list such that when a point is selected by the user as a destination from a registered point list which is a list of a plurality of points registered in advance, if the selected point is included as a previously set destination point in a combination recorded in the point database, then one or more previously set via-points included in that combination are displayed as the previously set via-point list, and a point selection acceptance unit for accepting a point such that if a point is selected by the user from the presented registered point list, the selected point is accepted as the destination specified by the user.

In this navigation apparatus, when a user specifies a point as a destination, points acceptable as via-points or candidates for via-points to the point specified as the destination are displayed, and thus the user can easily make a correct setting in terms of the destination and via-points.

In another aspect, the present invention also provides a navigation apparatus for, in accordance with a destination and one or more via-points specified by a user, searching for a route to the specified destination through the specified one or more via-points and presenting a detected route, comprising a point database in which a plurality of points and relations among those points are recorded, a destination acceptance unit for accepting a point as the destination when the user selects the point as the destination from the presented registered point list, and a via-point acceptance unit for accepting a point as a via-point or a candidate for a via-point if the relation of the point to the point accepted as the destination by the destination acceptance unit is recorded in the point database.

In this navigation apparatus, if a user simply specifies a point as a travel destination this time, then points related to the specified point are presented as candidates for via-points in the current travel or automatically set as via-points.

In this navigation apparatus having the capability of recording relations among points in the point database, the destination acceptance unit may include a related point presentation unit for presenting a recorded point list which is a list of points recorded in the point database, and presenting a related point list which is a list of points whose relation to a point selected by the user from the recorded point list is recorded in the point database, and a point selection acceptance unit for accepting a point such that if a point is selected by the user from the presented registered point list, the selected point is accepted as the destination specified by the user.

In this navigation apparatus, when a user specifies a point as a destination, points acceptable as via-points or candidates for via-points to the point specified as the destination are displayed, and thus the user can easily make a correct setting in terms of the destination and via-points.

In this navigation apparatus having the capability of recording relations among points in the point database, the via-point acceptance unit may accept a point as a candidate for a via-point if the relation of that point to the point accepted as the destination by the destination acceptance unit is recorded in the point database, and the navigation apparatus may further include a via-point setting unit for presenting, to the user, one or more candidates for via-points accepted by the via-point acceptance unit, accepting one or more points selected by the user from the presented candidates for via-points, and setting the accepted one or more points as via-points specified by the user.

In this navigation apparatus having the capability of recording relations among points in the point database, the via-point acceptance unit may accept a point as a candidate for a via-point if the relation of that point to the point accepted as the destination by the destination acceptance unit is recorded in the point database, and the navigation apparatus may further include a via-point editing unit for presenting, to the user, candidates for via-points accepted by the via-point acceptance unit, and performing editing including at least addition and/or deletion of a candidate for a via-point in accordance with an editing operation performed by the user, and a via-point setting unit for setting a via-point such that when a via-point decision operation is performed by the user, one or more points, which are presented as candidates for via-points at the time at which the via-point decision operation is performed, are set as via-points.

The navigation apparatus having the capability of recording relations among points in the point database may further include a point database update unit for updating the point database such that when a destination and one or more via-points are specified by the user, relations of the points specified as the via-points to the point specified as the destination are recorded in the point database, wherein the via-point acceptance unit may accept a point as a via-point or a candidate for a via-point if the relation of the point to the point accepted as the destination by the destination acceptance unit is recorded in the point database.

In this navigation apparatus, when a user simply specifies a point as a travel destination this time, via-points used in the past to travel to that destination are presented as candidates for via-points in the current travel or automatically set as via-points.

In this navigation apparatus having the capability of recording relations among points in the point database, relation levels among the plurality of points may be recorded in the point database, and the via-point acceptance unit may accept a point as a candidate for a via-point if the relation of that point to the point accepted as the destination by the destination acceptance unit is recorded in the point database, wherein the navigation apparatus may further include a point database update unit for updating the point database such that when a destination and one or more via-points are specified by the user, the relation level of the point specified as the destination to each point specified as a via-point is increased, and a via-point setting unit for setting one or more via-points such that candidates for via-points accepted by the via-point acceptance unit are presented to the user in the form of a list arranged in descending order of level of relation to a point accepted as a destination by the destination acceptance unit, and one or more points selected by the user from the presented candidates for via-points are accepted and set as via-points specified by the user.

In this navigation apparatus, when a point is specified as a destination, points related to the point specified as the destination are displayed in descending order of relation degree such that a point having a highest relation is displayed at the top, and thus a user can easily select proper via-points from the presented candidates for via-points.

The navigation apparatus having the capability of recording relations among points in the point database may further include a point database update unit for updating the point database such that when a destination and one or more via-points are specified by the user, a correlation between the point specified as the destination and each point specified as a via-point is recorded in the point database. In this case, the point database update unit may update the point database such that when a destination and a plurality of via-points are specified by the user, relations among the points specified as the via-points are recorded in the point database.

Points selected in the past by a user as a destination or via-points for a single route have relations with one another, and those points have a high probability that those points will be selected together again. Thus, presenting those points to a user makes it possible for the user to easily make correct a setting in terms of the destination and via-points.

In the above-described navigation apparatus and the method therefor, a destination selected by a user is first accepted, and points related to the point accepted as the destination are presented to the user. The user then selects one or more points as via-points from the presented points. Alternatively, a via-point selected by a user may be first accepted, and points related to the point accepted as the via-point may be presented to the user so that the user can select a destination and/or via-points from the presented points. Still alternatively, when a point is selected by a user, the selected point and points related to the selected point are presented to the user so that the user can select a destination and/or via-points from the presented points.

BRIEF DESCRIPTION OF THE DRAWINGS

FIG. 4 is a diagram showing an example of the content of a point database according to a first embodiment of the present invention;

DESCRIPTION OF THE PREFERRED EMBODIMENTS

The present invention is described in further detail below with reference to preferred embodiments.

First, a navigation apparatus according to a first embodiment of the present invention is described.

Figure 1:
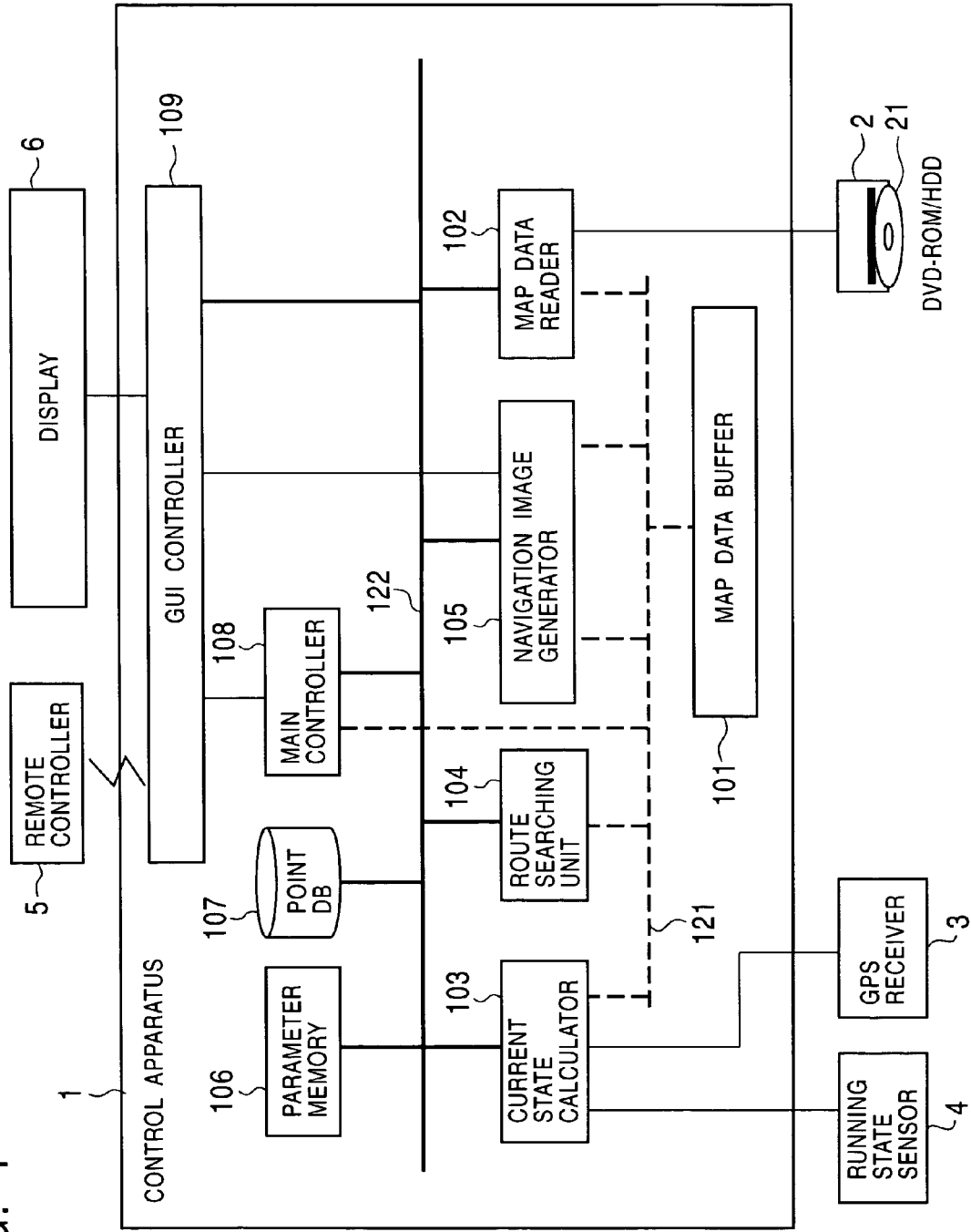
FIG. 1 is a block diagram showing a navigation apparatus according to an embodiment of the present invention.

FIG. 1 illustrates a structure of the navigation apparatus according to the first embodiment of the present invention.

As shown in FIG. 1, the navigation apparatus includes a control apparatus 1, a storage medium drive 2 for accessing a storage medium 21 such as a DVD-ROM or a hard disk on which map data is stored, a GPS receiver 3, a running state sensor 4 such as an angular acceleration sensor or a vehicle speed sensor for detecting a running state of a vehicle, a remote controller 5 used by a user to enter a command or data, and a display 6.

The control apparatus 1 includes a map data buffer 101, a map data reader 102, a current state calculator 103, a route searching unit 104, a navigation image generator 105, a parameter memory 106, a point database 107, a main controller 108, and a GUI controller 109. In FIG. 1, dotted lines 121 in the control apparatus 1 denote access paths along which map data stored in the map data buffer 101 is accessed by various parts. Thick lines denote paths along which control information or various kinds of data are transmitted, and thin lines extending from the GUI controller 109 denote paths along which operation control information or image information is input/output between the GUI controller 109 and the display 6 or the remote controller 5 operated by a user.

From the point of view of hardware, the control apparatus 1 is constructed using a CPU of a general type such as a microprocessor, a memory, and other peripheral devices such as a graphic processor or a geometric processor. The respective functional blocks of the control apparatus 1 shown in FIG. 1 are realized by means of software. More specifically, each of those functional blocks is realized by executing a program on the microprocessor. The program for the above purpose may be supplied to the control apparatus 1 through the storage medium 21 or another appropriate communication medium.

The data structure of map data stored on the storage medium 21 is described below.

The map data is organized in units called map sheets for respective geographical areas, and each map sheet has a plurality of levels depending on the scale of the map. Each map of each level of each map sheet is composed of one or more units. Each unit corresponds to a geographical area of a map sheet to which the unit belongs or corresponds to one of sub areas of the map sheet, that is, each unit represents a map of a corresponding area at a level of that unit.

Figure 2:
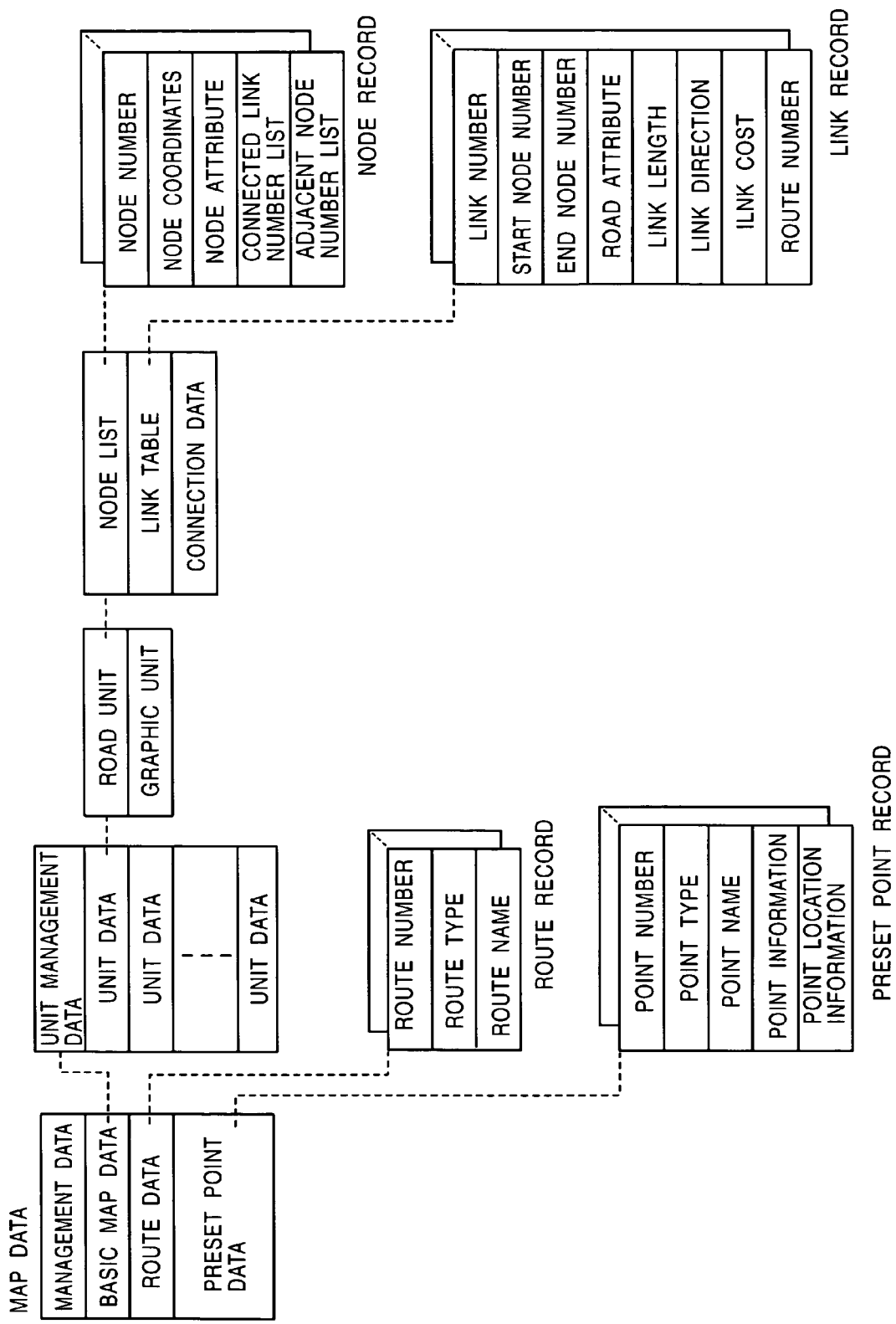
FIG. 2 is a diagram showing an example of the content of map data according to an embodiment of the present invention.

As shown in FIG. 2, the map data includes basic map data representing a map, route data, preset point data, and management data indicating relationships among units, map sheets, areas, and levels.

The basic map data includes unit data of respective units and unit management data indicating relationships of respective unit data to map sheets, areas, and levels. Each unit data includes a road unit and a graphic unit, wherein the road unit represents a road network in the corresponding unit, and the graphic unit represents a map in this unit.

Each road unit includes a node list, a link table, and a connection data indicating connections or relationships with nodes or links of other units.

Each road unit is represented in the form of a set of links, wherein each link represents a road segment in the form of a straight line, and each end of each link is called a node. A node is disposed at a connection point of a road, such as an intersection. A node is also disposed at a boundary between adjacent units. Each link has a direction. For each one-way road, only one link is disposed between two adjacent nodes such that the direction of the link is the same as the direction of the road. On the other hand, for each two-way road, two links with opposite directions are used.

Each node list includes node records corresponding to the respective nodes. Each node record includes a node number, coordinates of the node, a node attribute indicating whether the node is located at an intersection or an entrance/exit of an expressway, a connection link number list in which link numbers of links connected with the node are identified, and an adjacent node number list that is a list of node numbers of nodes adjacent to the node through links.

Each link table includes link records corresponding to respective links. Each link record includes a link number, a start node number indicating the node number of a start node of the link, an end node number indicating the node number of an end node of the link, a road attribute indicating various kinds of information about a road segment corresponding to the link, the length of the link, the direction of the link, a link cost indicating a search cost assigned to the link, and a route number the link belongs to. The road attribute indicates, for example, the road type of a road corresponding to a link, such as a toll road, a national road, or a prefectural road.

Each graphic unit includes geographical graphic elements of a map such as topographic graphic elements, road graphic elements, and facility graphic elements, textual information such as area names or facility names displayed on the map, and facility marks displayed on the map to indicate the presence of facilities such as a gas station.

The preset point data is data provided by a provider of map data and includes information about a plurality of points having a high probability of being set as a destination or a via-point. The preset point data includes present point records corresponding to respective points. Each preset point record includes data indicating a point number identifying a point, a point type indicating a type of a facility such as a gas station or a restaurant located at the point, a point name of the point or a name of the facility located at the point, point information indicating a telephone number of the facility located at the point, and point location information indicating the coordinates of the point or a unit in which the point is included.

The route data in the map data includes route records corresponding to respective roads. Each route record includes descriptions of a route number identifying a road, a route type indicating the type of the road, such as an expressway, a national road, or a prefectural road, and a route name of the road.

Parameters stored in the parameter memory 106 of the control apparatus 1 shown in FIG. 1 are described below.

Figure 3:
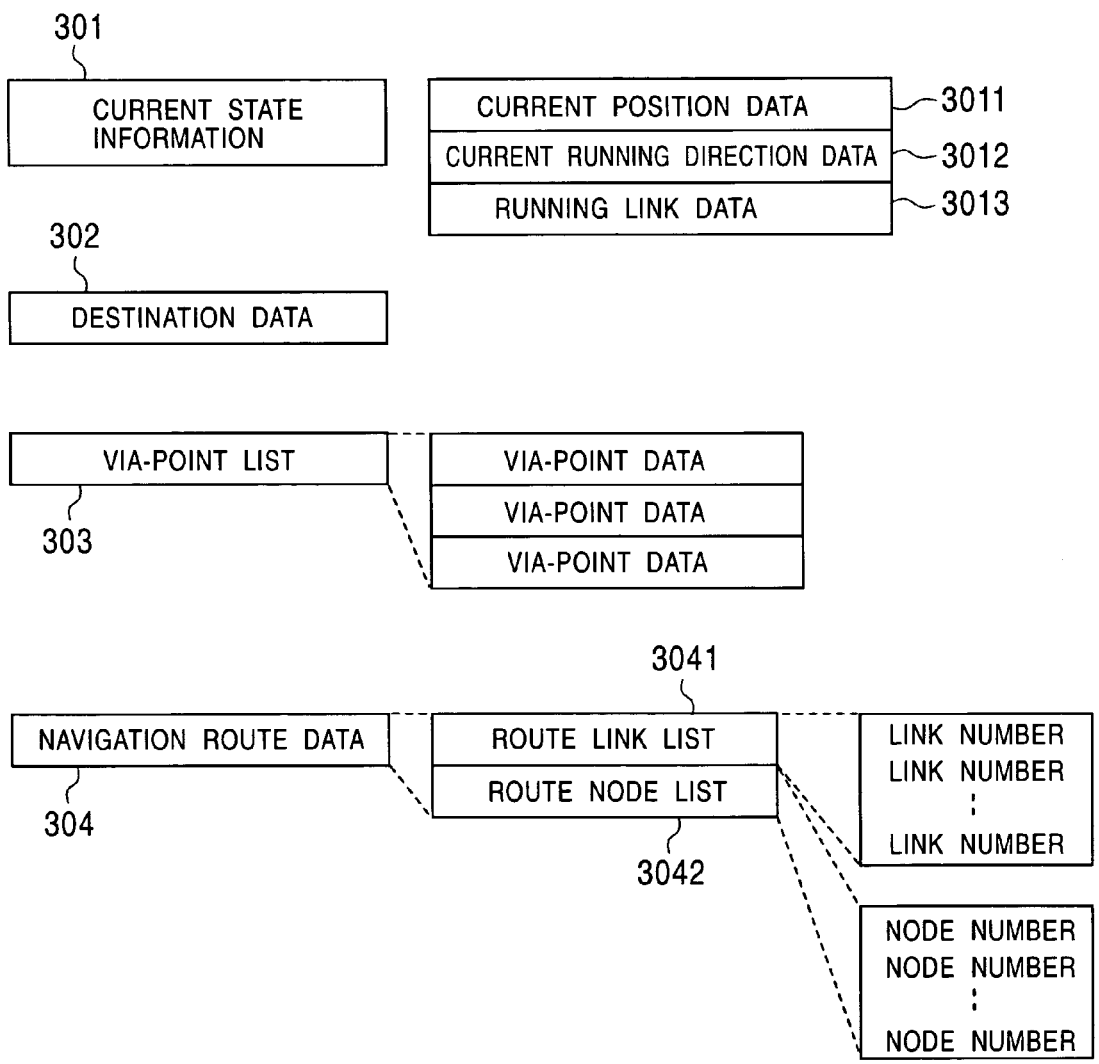
FIG. 3 is a diagram showing an example of the content of a parameter memory according to an embodiment of the present invention.

In the parameter memory 106, as shown in FIG. 3, current state information 301, destination data 302, a via-point list 303, and navigation route data 304 are stored.

The current state information 301 includes current position data 3011, current running direction data 3012, and running link data 3013. The current position data 3011 indicate the coordinates of the current position of a vehicle. The current running direction data 3012 indicate the current running direction of the vehicle. The running link data 3013 indicate the link number of a link on which the vehicle is currently running. The destination data 302 indicate the coordinates of the destination. The via-point list 303 is a list of coordinates of via-points stored in the order in which via-points are passed through.

The navigation route data 304 indicate a navigation route and includes a route link list 3041 indicating link numbers of links passed through by the navigation route in the order in which they are passed through and also includes a route node list 3042 indicating node numbers of nodes passed through by the navigation route in the order in which they are passed through.

Now, the content of the point database 107 is described below.

In the point database 107, as shown in FIG. 4A, a plurality of point records can be recorded. In each point record, a point number identifying a point, a point type indicating a type of a facility such as a gas station or a restaurant located at the point, a point name of the point or a name of the facility located at the point, point information indicating a telephone number of the facility located at the point, point location information indicating the coordinates of the point or a unit in which the point is included, via-point setting data, and related point data are stored.

The via-point setting data of each point record indicate point numbers of points that were specified as via-points when the point described in the point record was last specified as a destination, wherein the point numbers are recorded in the order in which corresponding points were set by a user. The related point data in each point record indicate point numbers of related points and relation levels of the respective related points, wherein the related points refer to points that were specified as via-points when the point described in the point record was specified as a destination at an arbitrary time in the past, and the relation levels refer to the frequency of occurrence of related points specified as via-points when the point of the point record including the related point data was specified as a destination.

Referring again to FIG. 1, in the navigation apparatus constructed in the above-described manner, under the control of the main controller 108, the map data reader 102 reads a particular area of map data from the storage medium 21 through the storage medium drive 2 and stores the read map data into the map data buffer 101.

The current state calculator 103 performs the following process repeatedly.

That is, the current state calculator 103 determines the current position coordinates indicating the link coordinates of the most likely current position, the current running direction indicating the most likely link direction in which the vehicle is currently running, and the running link indicating the most likely link on which the vehicle is currently running, by performing map matching or the like of a current position predicted from the output of the running state sensor 4 or the GPS receiver 3 on the map of the location determined as the current position in an immediately previous current state calculation. The current position coordinate, the current running direction, and the running link determined by the current state calculator 103 in the above-descried manner are set into the current position data 3011, the current running direction data 3012, and the running link data 3013, respectively.

In response to a request issued by a user, the main controller 108 performs a destination setting process. In this destination setting process, as will be described in further detail later, if a destination and one or more via-points are specified by the user through the remote controller 5 and the GUI controller 109, the specified destination and via-points are set in the destination data 302 and the via-point list 303, respectively.

Under the control of the main controller 108, the route searching unit 104 searches for a navigation route to the destination indicated by the destination data 302 passing through the via-points indicated by the via-point list 303. More specifically, the route searching unit 104 reads road data of road units in a necessary geographic area from the map data buffer 101, and determines a navigation route which passes through the link indicated by the running link data 3013 immediately after starting from the current position coordinates indicated by the current position data 3011 stored in the parameter memory 106 and which ends at the destination coordinates indicated by the destination data 302, on the basis of the cost model using the link costs described in the link records. The route data of the determined navigation route is stored in the route link list 3041 and the route node list 3042 of the navigation route data 304.

The main controller 108 also performs the following navigation image generation process repeatedly.

That is, the main controller 108 determines the display direction so as to be in the running direction indicated by the current running direction data 3012, and determines the scale ratio in accordance with the initial setting or the value specified by a user. Furthermore, the main controller 108 determines the display area of the map centered at the current position indicated by the current position data 3011 in accordance with the determined display direction and the determined scale ratio. In this process, the display direction is determined such that the current running direction always points upward.

Under the control of the main controller 108, the navigation image generator 105 draws an image including graphic map elements, textural information, facility marks, or the like according to the graphic unit in the determined display area of the map. Under the control of the main controller 108, the navigation image generator 105 also draws the current position mark pointing in the direction corresponding to the direction indicated by the current running direction data 3012, at the location corresponding to the current position indicated by the current position data 3011 such that the display direction is in the upward direction. If the navigation route data 304 is already determined, under the control of the main controller 108, the navigation image generator 105 draws an image indicating a navigation route in the range from the current position toward the destination in the determined display area in accordance with the navigation route data 304 such that the direction indicated by the determined display direction points upward. When the navigation apparatus is conducting route navigation, if the destination or a via-point is within the display area, the main controller 108 controls the navigation image generator 105 to draw the destination mark indicating the location of the destination or the via-point mark indicating the via-point.

Under the control of the main controller 108, the navigation image generator 105 generates a navigation image by performing the drawing process described above, and displays the resultant navigation image on the display 6 through the GUI controller 109.

Figure 5:
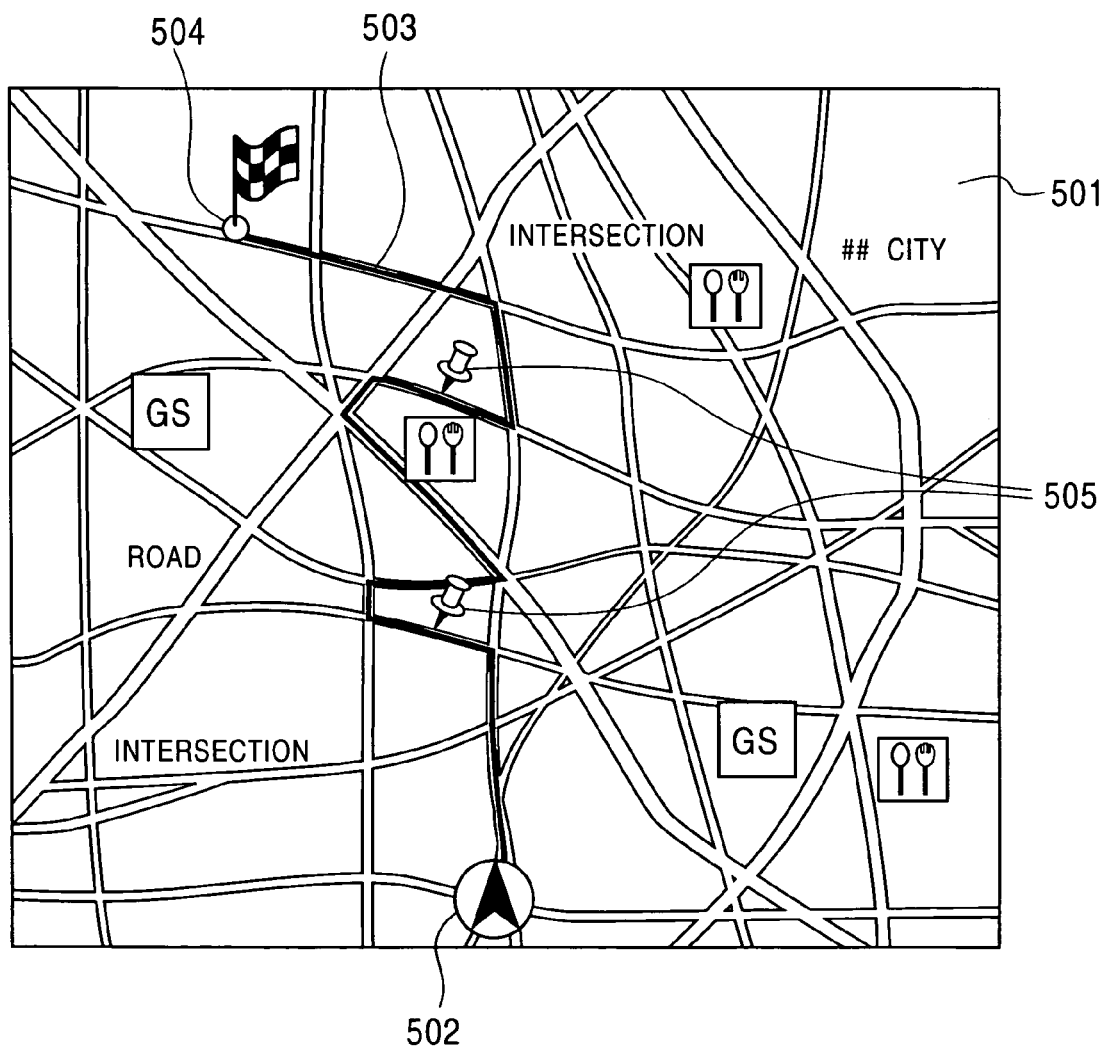
FIG. 5 is a diagram showing an example of a navigation image used in providing route guidance according to an embodiment of the present invention.

FIG. 5 shows an example of a navigation image generated and displayed in the above-described manner. In the example of the navigation image shown in FIG. 5, a map image 501 including graphic map elements, textual information, facility marks, etc. is displayed, and a current position mark 502, a navigation route image 503, a destination mark 504, a via-point mark 505, etc. are displayed such that they are superimposed on the map image 501. When the navigation route data 304 is not determined and thus the navigation apparatus is not performing route navigation, the navigation route image 503 is not drawn. When the destination or the via-point is not within the display area, the destination mark 504 or the via-point mark 505 is not displayed.

During the route navigation operation, the main controller 108 monitors whether the distance between the current position indicated by the current position coordinates represented by the current position data 3011 and the destination indicated by the destination coordinates represented by the destination data 302 becomes smaller than a predetermined value (for example, a few tens of meters). If the distance becomes smaller than the predetermined value, then the main controller 108 determines that the destination has been reached, and the main controller 108 clears the navigation route data 304 and the destination data 302. Thus, the route navigation operation is completed.

The details of the destination setting process performed in accordance with a destination and via-points specified by a user are described below with reference to a flow chart shown in FIG. 6.

Figure 6:
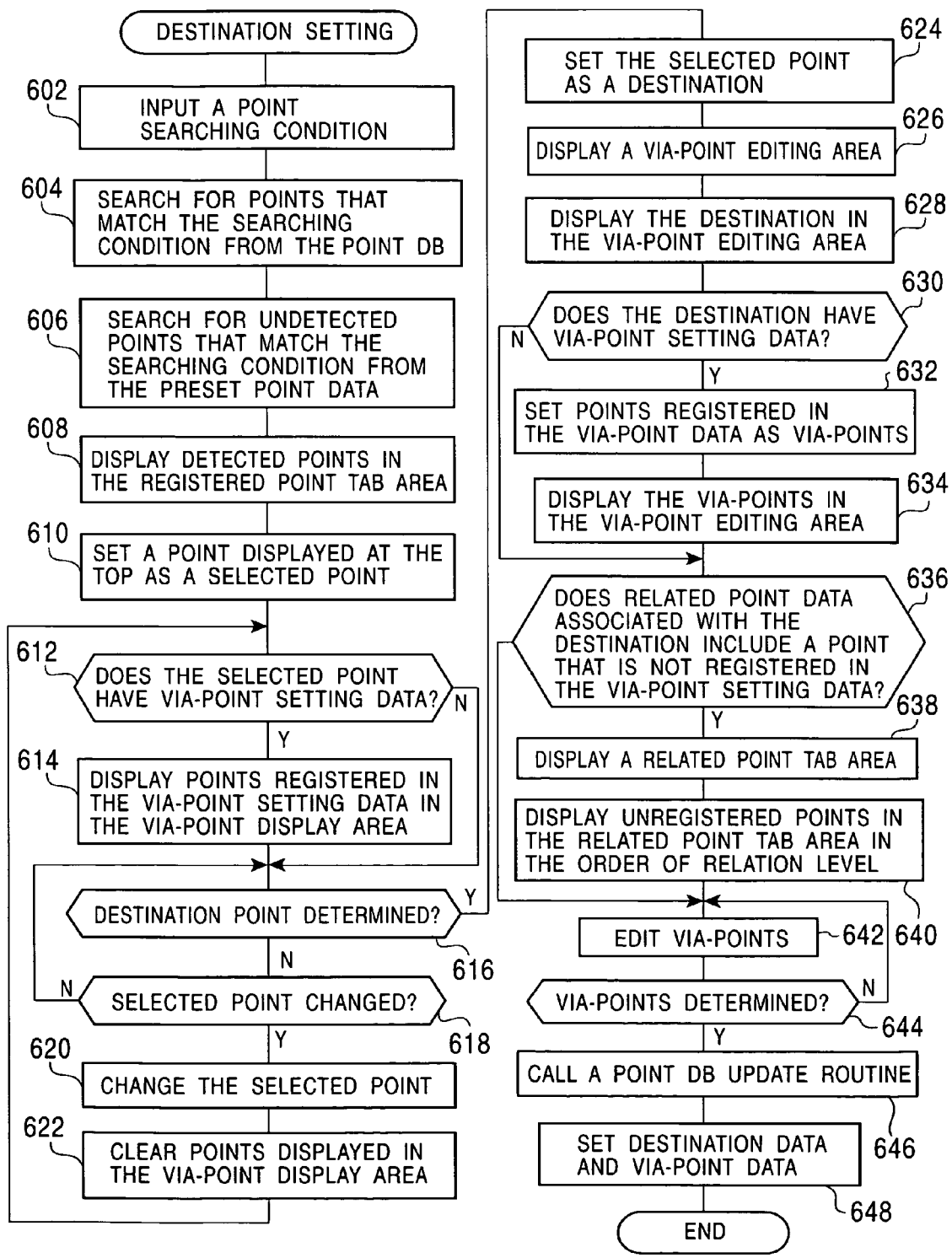
FIG. 6 is a flow chart showing a process of setting a destination according to the first embodiment of the present invention.

In this process, as shown in FIG. 6, the main controller 108 displays a screen for use by a user to enter a point search condition on the display 6 through the GUI controller 109. With this screen, the user enters a condition under which to search for a point to be set as a destination (step 602). The condition may be, for example, a name of a point or a facility located at a point, a type of a point such as a restaurant or a gas station, or a telephone number of a facility located at a point. The condition may be to specify that a point be recorded in the point database 107.

If the search condition is entered, point records in the point database 107 are searched to detect points that match the given search condition (step 604). Thereafter, preset point records in the preset point data are examined to detect points that are not detected in the point database 107 but that match the search condition (step 606).

Figure 7A:
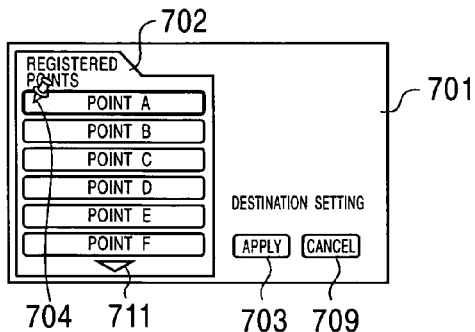
FIGS. 7A to 7H are diagrams showing a specific example of the destination setting process in which a destination and one or more via-points are set in response to operations performed by a user, according to the first embodiment of the present invention.

A destination setting window 701 such as that shown in FIG. 7A is displayed on the display 6 by the GUI controller 109, and a list of names of detected points is displayed in a registered point tab area 702 in the destination setting window 701 (step 608). For points recorded in point records including valid via-point setting data, marks 901 are displayed together with point names to indicate that those points have valid via-point setting data, as is the case with point A, point D, and point F in the example shown in FIG. 9A. Of point names displayed in the registered point tab area 702, the point corresponding to the point name displayed at the top is set as a selected point (step 610), and a point record in which the selected point is recorded is examined to determine whether the selected point has valid via-point setting data (step 612). If the selected point is not such a point, monitoring is performed to detect an operation of clicking the apply button 703 on the destination setting window 701 to determine the destination (step 616) and to detect an operation of moving a pin-shaped cursor 704 to change the selection point (step 618).

Figure 9A:
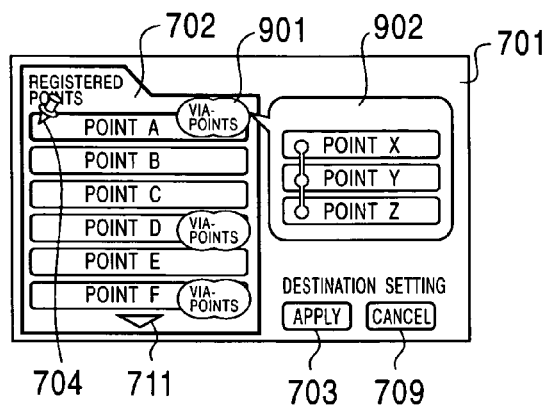
FIGS. 9A to 9D are diagrams showing another specific example of the destination setting process in which a destination and one or more via-points are set in response to operations performed by a user, according to the first embodiment of the present invention.

On the other hand, if the point record of the selected point has valid via-point setting data (step 612), then as shown in FIG. 9A, point names of points corresponding to point numbers recorded in the via-point setting data recorded in the point record are displayed in a registered via-point display area 902 in the form of a pop-up window in the destination setting window 701, in the order opposite to the order in which points are recorded in the via-point setting data (in other words, if the points displayed in the registered via-point display area 902 are viewed from the bottom to the top, the order is the same as the order in which the points are recorded in the via-point setting data) (step 614). Thereafter, the occurrence of a destination determination operation (step 616) and the occurrence of an operation of changing the selected point by moving the pin-shaped cursor 704 (step 618) are monitored.

Figure 7B:
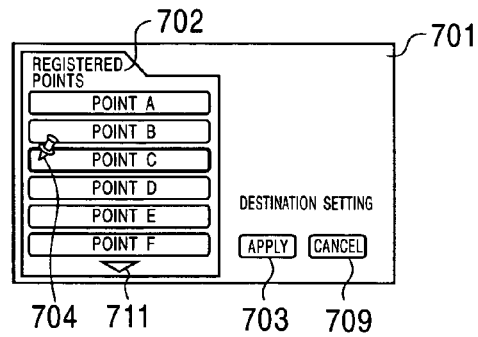
Figure 9B:
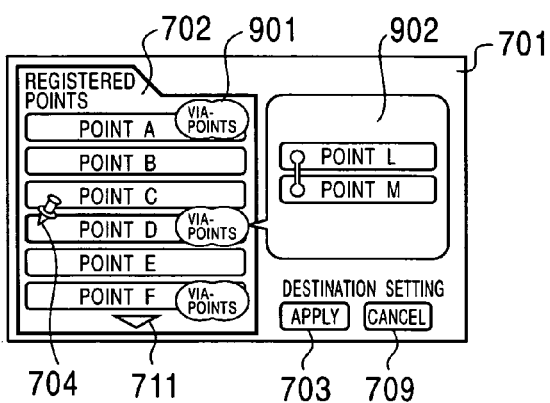

If an operation of changing the selected point occurs (step 618), the selected point is changed, as described in FIG. 7B or 9B, to a point indicated by the pin-shaped cursor 704 (step 620). If the registered via-point display area 902 is displayed, it is closed (step 622) and the flow returns to step 612 to repeat the above-described process.

Figure 7C:
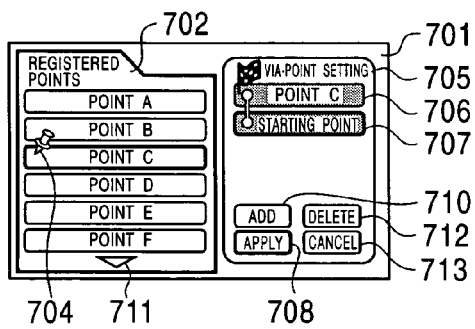

On the other hand, if a destination determination operation occurs (step 616), the currently selected point is set as the destination (step 624). Furthermore, as shown in FIG. 7C, a via-point editing area 705 is formed in the destination setting window 701 (step 626), and the point name 706 of the destination is displayed together with a start point 707 in the via-point editing area 705 (step 628).

Thereafter, the point record of the point specified as the destination is examined to determine whether the point record includes valid via-point setting data (step 630). If the point specified as the destination is not such a point, the flow jumps to step 636.

Figure 9C:
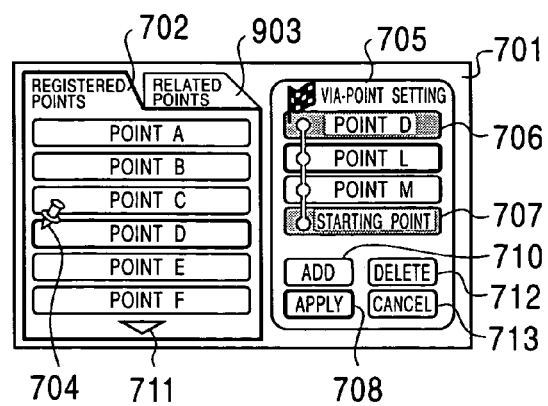

On the other hand, if valid via-point setting data is included in the point record of the point specified as the destination (step 630), then as shown in FIG. 9C, points whose point numbers are recorded in the via-point setting data of the point record are set as via-points to pass through in the order described in the via-point setting data (step 632). In the via-point editing area 705, the point names of the respective points set as via-points are displayed between the point name 706 of the destination and the start point 707, from the bottom to the top in the same order as the order in which via-points are recorded in the via-point setting data (step 634). Thereafter, the process proceeds to step 636.

In step 636, it is determined whether the point record in which the point specified as the destination is recorded has valid related-point data, and whether the related-point data includes a point number that is not recorded in the via-point setting data of the point record. If all point numbers in the related-point data are recorded in the via-point setting data, the process jumps to step 642. However, if the related-point data includes one or more point numbers that are not recorded in the via-point setting data, then as shown in FIG. 9C a related-point tab area 903 is displayed (step 638), and point names corresponding to the point numbers that are recorded in the via-point setting data are displayed in the related-point tab area 903 in descending order of the relation level described in the related-point data such that a point name having a highest relation level is displayed at the top (step 640). Thereafter, the process proceeds to step 642.

When the related-point tab area 903 is displayed, the related-point tab area 903 and the registered-point tab area 702 partially overlap, and a tab area displayed on top is switched in response to a clicking operation performed by a user.

In step 642, via-point editing, which will be described in detail later, is performed in accordance with editing operations performed by the user until via-points are determined by clicking an apply button 708 in the via-point editing area 705 (step 644).

If the operation of determining via-points is performed (step 644), a point database update routine, which will be described later, is called (step 644) and the point database 107 is updated. The point coordinates indicated by the point location information described in the point record of the destination specified in the via-point editing area 705 in the via-point determination process and the point coordinates indicated by the point location information of each via-point are respectively recorded in the destination data 302 and the via-point data of the via-point list 303 (step 648), and the process is ended.

In the above-described process, if a cancel button 709 in the destination setting window 701 or a cancel button 713 in the via-point setting area is clicked, the main controller 108 immediately terminates the destination setting process.

The details of the via-point editing process and specific examples of the operation performed by a user to set the destination and via-points in the destination setting process are described below.

First, the process is described for the case in which points detected in the searching process performed in accordance with the search condition specified by the user do not have valid via-point setting data or valid related-point data in a corresponding point record. This is the case, for example, when no point record is recorded in the point database 107 or when a via-point is set for the first time.

First, as shown in FIG. 7A, the destination setting window 701 is displayed, and a list of point names of detected points A to F is displayed in the registered point tab area 702 wherein the point A at the top is set as the selected point and the point name thereof is highlighted. In this state, if the user moves the pin-shaped cursor 704 to the point C, then as shown in FIG. 7B, the point C is set as the selected point and the point name thereof is highlighted.

In this state, if the user clicks the apply button 703, then as shown in FIG. 7C, the via-point editing area 705 is displayed. The point name 706 of the point C specified as the selected point is displayed as the destination point in the via-point editing area 705, and a dummy point is displayed as a start point 707. When the via-point editing process is started, if no via-points are set yet, the start point 707 is set as an editing point, and the start point 707 is highlighted.

Figure 7D:
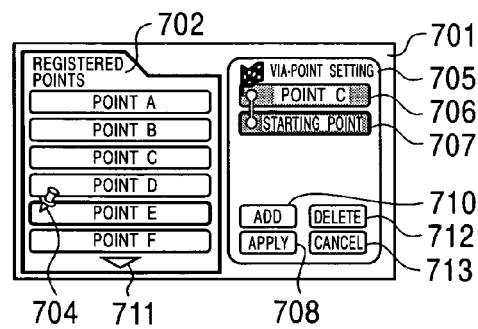
Figure 7E:
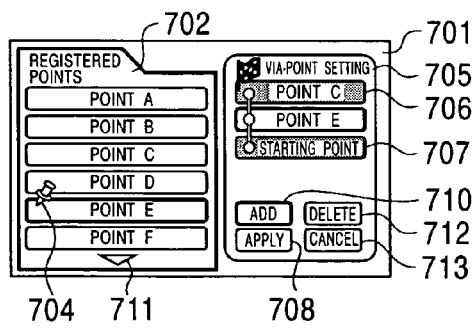

In this state, as shown in FIG. 7D, if the user sets a point E by moving the pin-shaped cursor 704 on the registered point tab area 702, the point E is set as the selected point, and the point name thereof is highlighted. If an add button 710 in the via-point editing area 705 is clicked by the user, then as shown in FIG. 7E, the currently selected point is added as a via-point next to the current editing point (the dummy point at the start point in this specific example), and the point name thereof is displayed above the point name at the current editing point. The point name thereof is highlighted and the editing point is moved to the point E added as the via-point.

Figure 7F:
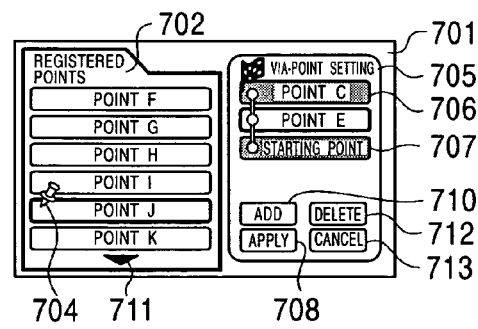

On the other hand, as shown in FIG. 7F, if the user clicks a scroll button 711 in the registered point tab area 702, the point name list in the registered point tab area 702 is scrolled.

Figure 7G:
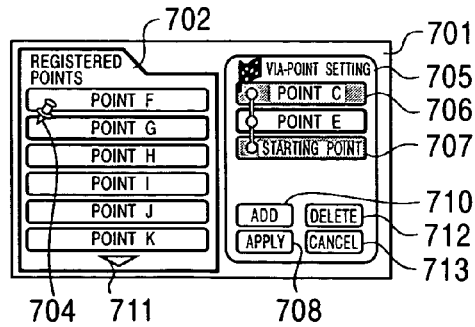
Figure 7H:
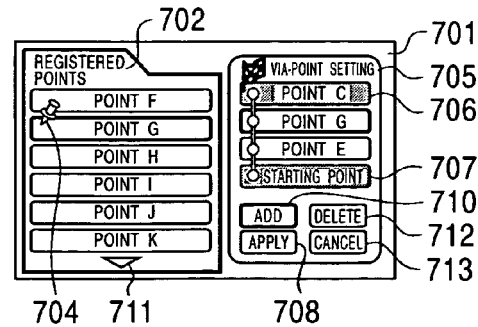

If the user selects a point G by moving the pin-shaped cursor 704 in the registered point tab area 702 as shown in FIG. 7G, the point G is set as the selected point and the point name thereof is highlighted. Herein, as shown in FIG. 7H, if the user clicks the add button 710 in the via-point editing area 705, the point G currently set as the selected point is added as a via-point next to be passed through next to the editing point (the point E in this specific case), and the point name thereof is displayed above the point name at the current editing point in the via-point editing area 705. The point name thereof is highlighted and the editing point is moved to the point G added as the via-point.

The user can add further via-points in a similar manner.

A via-point may be added at a location next to the via-point that has been set last or inserted at an arbitrary location between already set via-points.

Figure 8A:
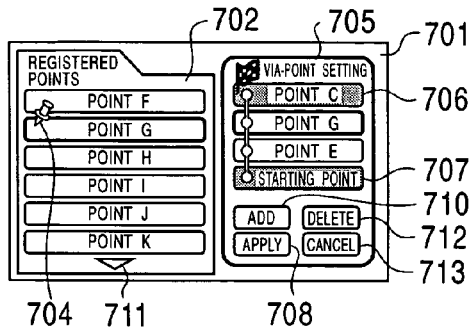
FIGS. 8A to 8G are diagrams showing another specific example of the destination setting process in which a destination and one or more via-points are set in response to operations performed by a user, according to the first embodiment of the present invention.
Figure 8B:
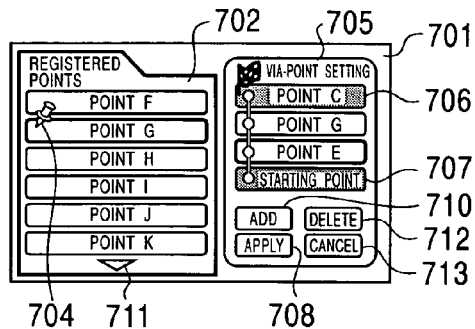

For example, in a state in which, as shown in FIG. 8A, a point C is set as a destination, points E and G as via-points, and a point G as an editing point, if the point name of the point E in the via-point editing area 705 is selected by the user as shown in FIG. 8B, the editing point is switched to the point E corresponding to the selected point name and the point name thereof is highlighted.

Figure 8C:
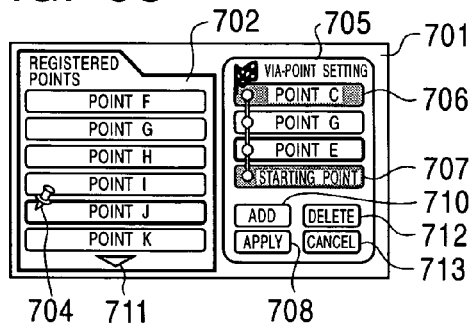
Figure 8D:
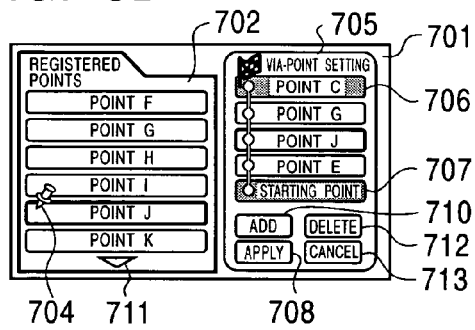

In this state, as shown in FIG. 8C, if the user selects a point J by moving the pin-shaped cursor 704 in the registered point tab area 702, then the point J is set as the selected point and the point name thereof is highlighted. Furthermore, as shown in FIG. 8D, if the user clicks the add button 710 in the via-point editing area 705, the point J currently set as the selected point is added as a via-point to be passed through next to the editing point (the point E in this specific case), and the point name thereof is displayed above the point name of the editing point in the via-point editing area 705. The point name of the point J is highlighted and the editing point is moved to the point J added as the via-point.

In the via-point editing process, the user can delete the destination point and/or an arbitrary via-point.

Figure 8E:
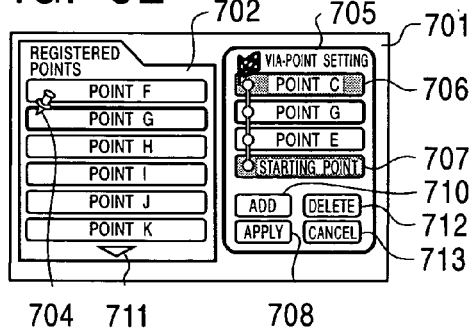
Figure 8F:
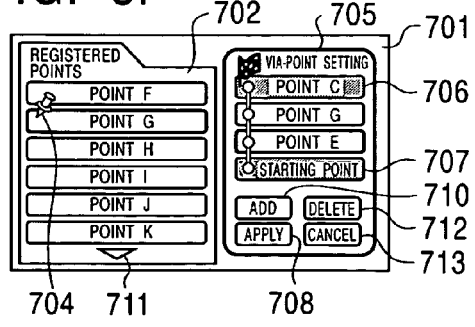

For example, in a state in which, as shown in FIG. 8E, the point C is set as the destination, points E and G as via-points, and the point G as the editing point, if the user selects the point name of the point E in the via-point editing area 705, then the editing point is switched to the point whose point name is selected, that is, the point E in this case, and the point name of the point E is highlighted as shown in FIG. 8F.

Figure 8G:
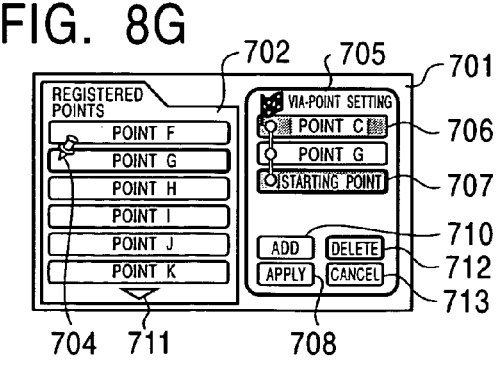

In this state, as shown in FIG. 8G, if the user clicks the delete button 712 in the via-point editing area 705, a point currently set as the editing point (the point E in this specific case) is deleted from the via-points, and a point (a dummy point set as the start point in this specific case) displayed below the point E deleted from the via-points is set as the new editing point and the point name thereof is highlighted. The destination set in the via-point editing area 705 may also be deleted in a similar manner. In this case, a point set as a final via-point may be set as a new destination. In this case, when the destination is deleted, no points are set as via-points, a destination may be accepted in a similar manner as is when a via-point is accepted.

Now, the process is described for the case in which points detected in the searching process performed in accordance with the search condition specified by the user include a point having valid via-point setting data or valid related-point data recorded in a corresponding point record.

In this case, first, as shown in FIG. 9A, the destination setting window 701 is displayed. In this destination setting window 701, a list of names of detected points A to F is displayed in the registered point tab area 702, and the point A at the top is set as the selected point and the point name thereof is highlighted. If each of the points A, D, and F has valid via-point setting data recorded in the corresponding point data, the point names of those points are displayed together with marks 901 indicating that those points have valid via-point setting data.

In this case, the point A currently set as the selected points has valid via-point setting data recorded in the point record of the point A, and thus point names of points Z, Y, and X recorded in the via-point setting data of the point record of the point A are displayed in the registered via-point display area 902 such that the order of displayed point names as viewed from the bottom to the top is the same as the order in which the points are recorded in the via-point setting data.

In this state, if the user moves the pin-shaped cursor 704 to the point D, then as shown in FIG. 9B, the point D is set as the selected point and the point name thereof is highlighted. Because the point D also has valid via-point setting data recorded in the point record of the point D, point names of points M and L recorded in the via-point setting data of the point record of the point D are displayed in the registered via-point display area 902 such that the order of displayed point names as viewed from the bottom to the top is the same as the order in which the points are recorded in the via-point setting data.

In this state, if the user clicks the apply button 703, then as shown in FIG. 9C, the via-point editing area 705 is displayed, and the point name of the point D currently set as the selected point is displayed as the point name 706 of a destination together with a dummy point as a start point 707 in the via-point editing area 705. Furthermore, between the point name 706 of the destination and the start point 707, points M and L which are recorded in the via-point setting data of the point D set as the destination are displayed as via-points in the same order, as viewed from the bottom to the top, as the order in which the points M and L are recorded in the via-point setting data.

In the case in which the related point data of the point D set as the destination includes one or more points included in the via-point setting data of the point D, the related point tab area 903 is displayed and point names of the points, which are recorded in the related point data but not in the via-point setting data, are displayed in the related point tab area 903 in descending order of the relation level described in the related point data. Note that, at this stage, the registered point tab area 702 is displayed on top and the point names in the related point tab area 903 are not actually seen.

In this state, the via-point editing process is started. When the via-point editing process is started, if one or more via-points have already been set, a via-point (the point L in this specific case) that is to be passed through last is set as the editing point and the point name thereof is highlighted.

Figure 9D:
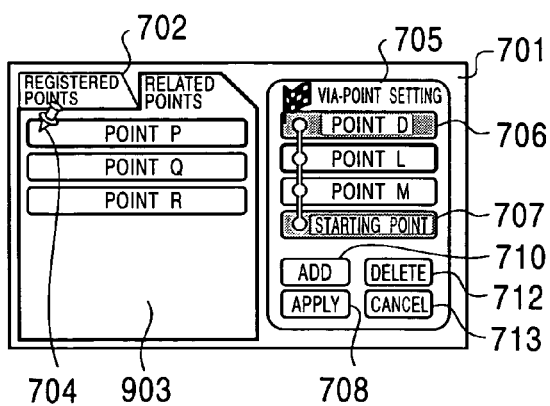

In the via-point editing process, when the registered point tab area 702 is displayed on top as shown in FIG. 9C, if the tab of the related point tab area 903 is clicked by the user, then the related point tab area 903 is displayed on top as shown in FIG. 9D. Conversely, when the related point tab area 903 is displayed on top as shown in FIG. 9D, if the tab of the registered point tab area 702 is clicked by the user, then the registered point tab area 702 is displayed on top as shown in FIG. 9C.

In the via-point editing process in the state in which the registered point tab area 702 is displayed on top as shown in FIG. 9C, a point selected in the registered point tab area 702 can be added as a via-point to the via-point editing area 705, and a via-point can be deleted from the via-point editing area 705 in response to an operation performed by the user in a similar manner as described above with reference to FIGS. 7 and 8. In the via-point editing process in the state in which the related point tab area 903 is displayed on top as shown in FIG. 9D, a point selected in the related point tab area 903 can be added as a via-point to the via-point editing area 705, and a via-point can be deleted from the via-point editing area 705 in response to an operation performed by the user in a similar manner as described above with reference to FIGS. 7 and 8 except that the registered point tab area 702 is replaced with the related point tab area 903.

In the state in which the via-point editing process is active, if the apply button 708 in the via-point editing area 705 is clicked, then in step 648 shown in FIG. 6, point coordinates indicated by the point location information recorded in the point record of the point whose point name is displayed as the destination in the via-point editing area 705 are stored in the destination point data 302, and point coordinates indicated by the point location information recorded in the point record of each point whose point name is displayed as a via-point in the via-point editing area 705 are stored in passing-through order in the via-point data of the via-point list 303. Thereafter, a navigation route to the destination point set in the destination point data 302 through the respective via-points set in the via-point data is searched for. A detected navigation route is displayed on the display, for example, in a manner as shown in FIG. 5, and route navigation along the detected navigation route is started.

The details of the routine, in step 646 in FIG. 6, of updating the point database are described below with reference to a flow chart shown in FIG. 10.

Figure 10:
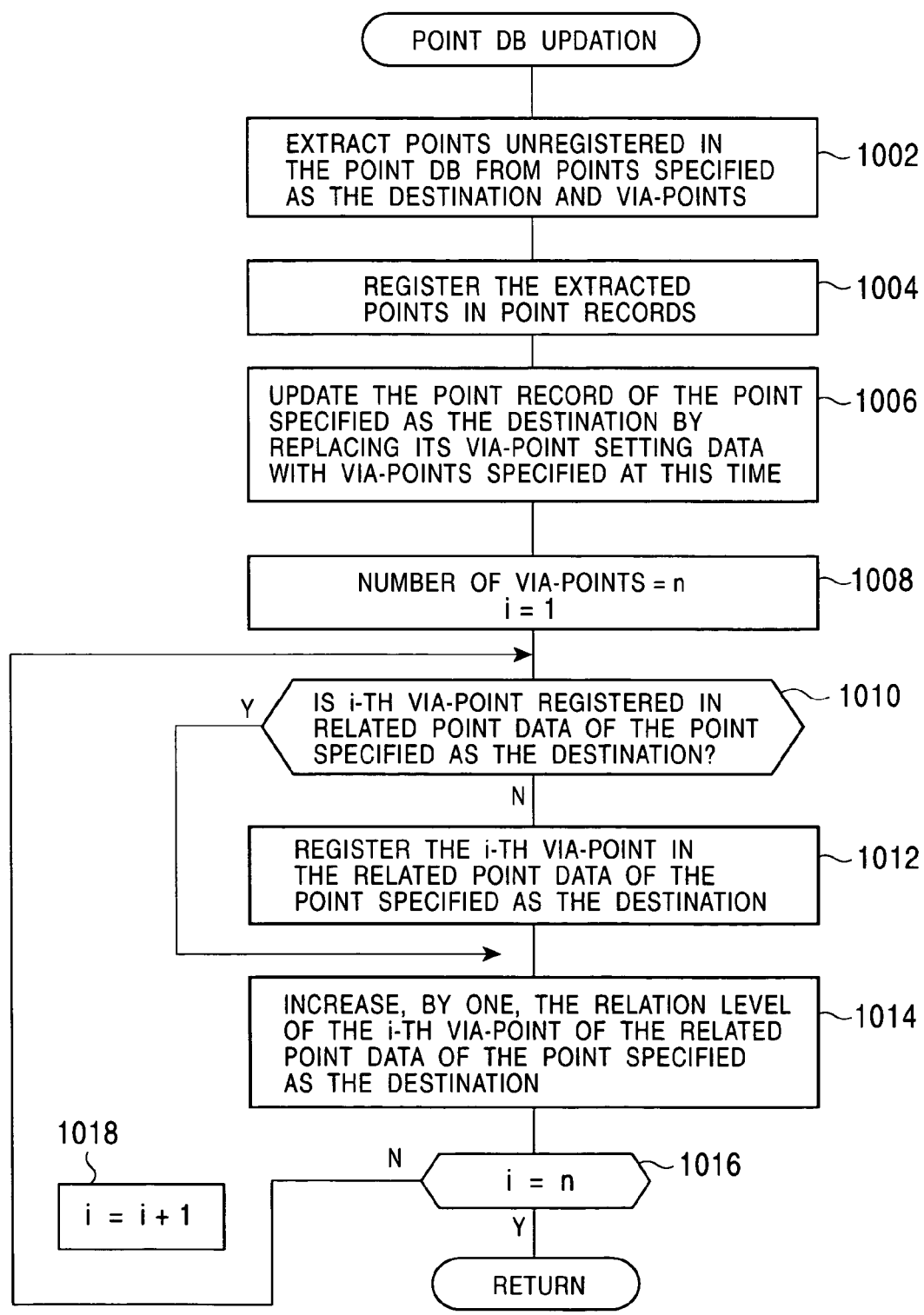
FIG. 10 is a flow chart showing a process of updating the point database according to the first embodiment of the present invention.

In this point database update routine, as shown in FIG. 10, it is determined whether all points whose point name is displayed as the destination or a via-point in the via-point editing area 705 are registered in the point database 107. If a point that is not registered in the point database 107 is detected (step 1002), a point record of the detected point is created in the point database 107 (step 1004), and a point number, a point type, a point name, point information, and point location information are recorded in the created point record. In the process of recording the information in the point record, information recorded in a preset point record corresponding to the point is used (step 1006).

Thereafter, via-point setting data of a point record of a point whose point name is currently displayed as the destination in the via-point editing area 705 is cleared, and points whose point name is currently displayed as a via-point in the via-point editing area 705 are determined as via-points and the point numbers thereof are recorded in the via-point setting data in the passing-through order.

Thereafter, the following process is performed for each via-point (steps 1008, 1016, and 1018). That is, for via-points whose point number is not registered in the related point data of the point record of the destination, point numbers of such via-points are registered in the related point data of the point record of the destination (steps 1010 and 1012), and the relation level thereof is set to 0. On the other hand, for via-points whose point number is registered in the related point data of the point record of the destination, the relation level thereof is increased by 1 (step 1014).

The first embodiment of the present invention has been described above.

In the embodiment described above, a point record in the point database 107 may be directly edited by a user without actually setting a destination or via-points. In this case, for example, the user may edit a point record by performing a process similar to the destination setting process described above except that step 648 is skipped.

In the first embodiment described above, a point specified by a user as a destination of a navigation route to be provided is recorded in the point database 107 such that via-points specified to be passed through before the destination are related to the point specified as the destination. Once the data is recorded, the user can easily specify the via-points related to the destination simply by specifying only the destination. Furthermore, when the user specifies a destination, a list of via-points specified in the past as via-points of that destination is presented as well as the destination so that the user can select current via-points from the presented list.

This makes it possible for the user to easily set a destination and via-points.

In the embodiment described above, in the point database 107, points specified by a user as via-points to a destination are related to the destination by recording those points in a point record of the point specified as the destination so that via-points related to a destination can be referred to when setting of a destination and via-points is performed. Alternatively, a correlation between a point specified as a destination and each point specified as a via-point to the destination may be recorded in the point database 107 so that the relationship can be referred to when a destination or a via-point is set.

A second embodiment of the present invention is described below. In this second embodiment, a specific example of the process is disclosed for the case in which a correlation between a destination and each of the via-points is recorded in the point database 107.

In this second embodiment, the content of the point database 107, the destination setting process, and the point database update process according to the first embodiment described above are modified as follows.

That is, in the second embodiment, as shown in FIG. 4B, each point record recorded in the point database 107 includes a point number identifying a point, a point type indicating a type of facility such as a gas station or a restaurant located at the point, a point name of the point or a name of the facility located at the point, point information indicating a telephone number of the facility located at the point, point location information indicating coordinates of the point or a unit in which the point is included, and related point data. The related point data is recorded as follows. For example, if a point corresponding to a point record is set by a user as a destination and another point corresponding to another point record is set as a via-point, each point is recorded as a related point in the related point data of the other point record such that the point number of the former point record of the point set as the destination is recorded in the related point data of the latter point record of the point set as the via-point, the point number of the latter point record of the point set as the via-point is recorded in the related point data of the former point record of the point set as the destination, and a relation level of each point is recorded in the related point data of each point record.

The process of setting a destination according to the second embodiment is described below with reference to a flow chart shown in FIG. 11.

Figure 11:
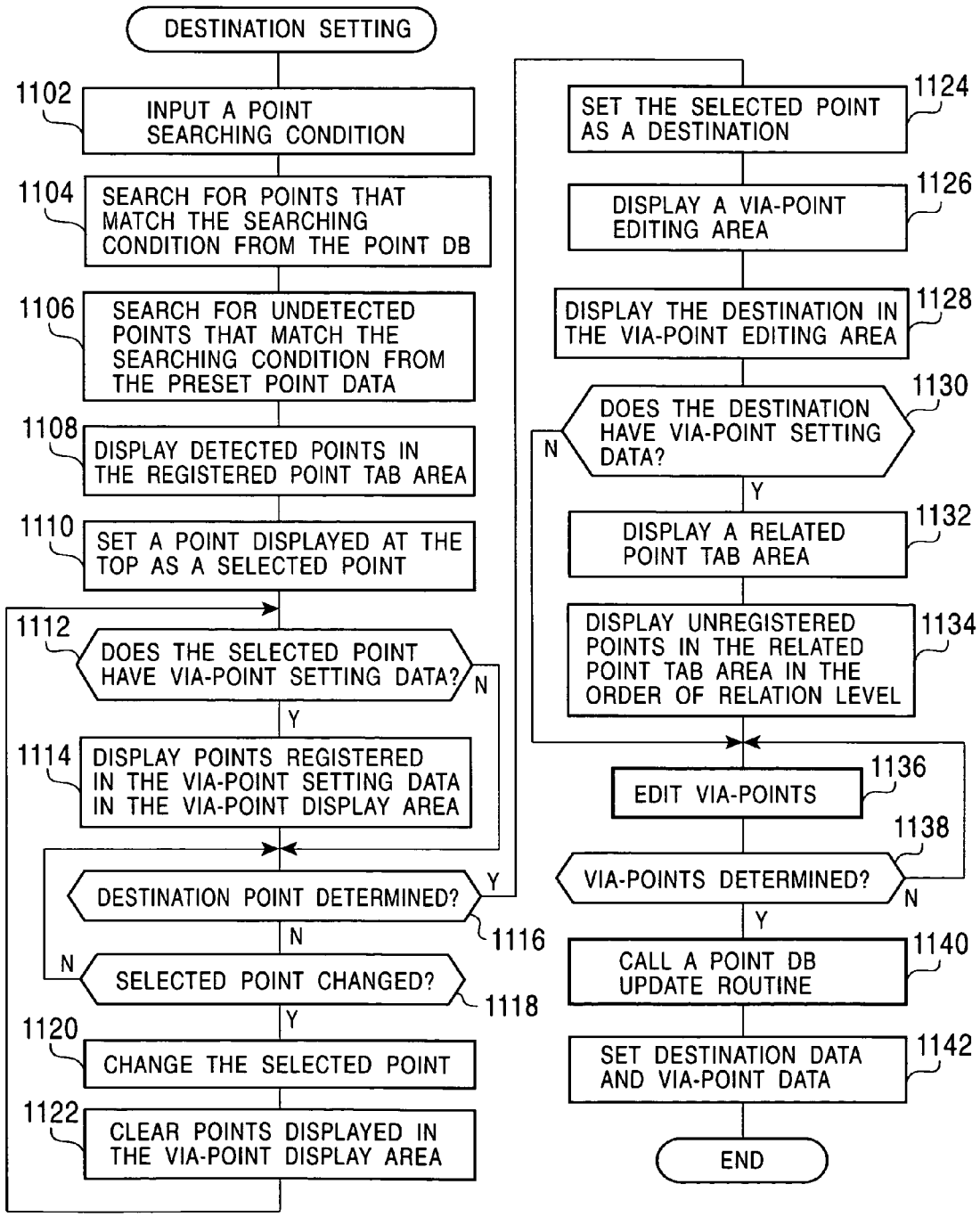
FIG. 11 is a flow chart showing a process of setting a destination according to a second embodiment of the present invention.

As shown in FIG. 11, as in the destination setting process according to the first embodiment, the user enters a condition under which to search for a point to be set as a destination (step 1102). In response, points that match the search condition are searched for from the point database 107 and the preset point data (steps 1104 and 1106).

Figure 12A:
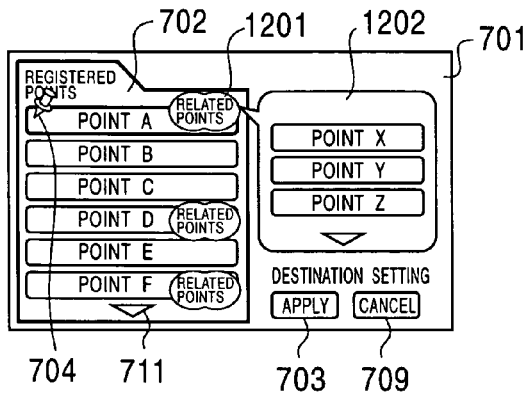
FIGS. 12A to 12F are diagrams showing a specific example of the destination setting process in which a destination and one or more via-points are set in response to operations performed by a user, according to the second embodiment of the present invention.

A destination setting window 701 such as that shown in FIG. 12A is displayed on the display 6 by the GUI controller 109, and a list of point names of detected points is displayed in a registered point tab area 702 in the destination setting window 701 (step 1108). When a point has valid related point data in its point record, a point name thereof is displayed together with a mark 1201 indicating that the point has valid related point data, as is the case with points A, D, and F shown in FIG. 12A. Of the point names displayed in the registered point tab area 702, the point corresponding to the point name displayed at the top is set as a selected point (step 1110), and a point record of the selected point is examined to determine whether valid related point data is recorded in that point record (step 1112). If the selected point is not such a point, operation is monitored to detect an operation of clicking the apply button 703 on the destination setting window 701 to determine the destination (step 1116) and to detect an operation of moving a pin-shaped cursor 704 to change the selection point (step 1118).

On the other hand, if the point record of the selected point has valid related point data (step 1112), then as shown in FIG. 12A, point names of points corresponding to point numbers recorded in the related point data recorded in the point record are displayed in a related point display area 1202 in the form of a pop-up window in the destination setting window 701, in descending order of relation level recorded in the related point data (step 1114). Thereafter, the occurrence of a destination determination operation (step 1116) and the occurrence of an operation of changing the selected point by moving the pin-shaped cursor 704 (step 1118) are monitored.

If an operation of changing the selected point occurs (step 1118), the selected point is changed to the specified point (step 1120). If the related point display area 1202 is displayed, it is closed (step 1122) and the flow returns to step 1112 to repeat the above-described process.

On the other hand, if a destination determination operation occurs (step 1116), the currently selected point is set as the destination (step 1124). Furthermore, as shown in FIG. 12C, a via-point editing area 705 is formed in the destination setting window 701 (step 1126), and the point name 706 of the destination is displayed together with a start point 707 in the via-point editing area 705 (step 1128).

Thereafter, the point record of the point specified as the destination is examined to determine whether the point record includes valid related point data (step 1230). If the point specified as the destination is not such a point, the flow jumps to step 1136.

Figure 12B:
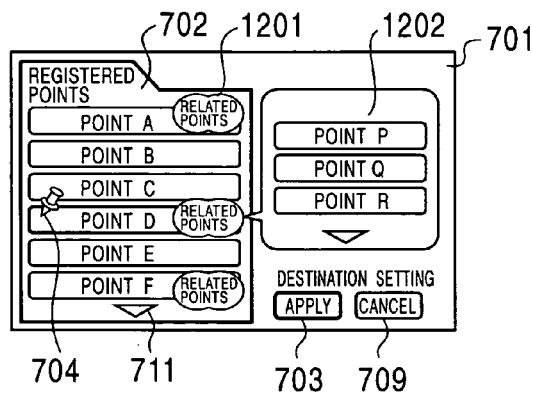
Figure 12C:
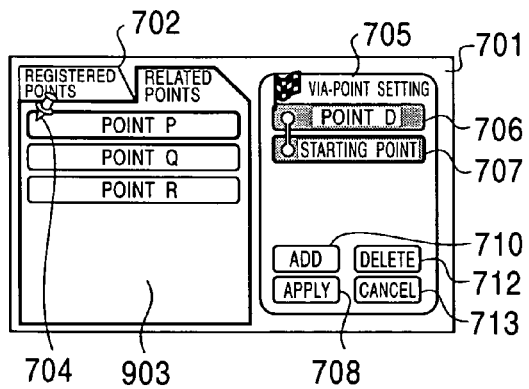

On the other hand, if valid related point data is included in the point record of the point specified as the destination (step 1130), then as shown in FIG. 12C, the related point tab area 903 is displayed (step 1132), and point names corresponding to the point numbers that are recorded in the related point data are displayed in the related-point tab area 903 in descending order of the relation level described in the related-point data such that a point name having a highest relation level is displayed at the top (step 1134). Thereafter, the process proceeds to step 1136.

When the related-point tab area 903 is displayed, the related-point tab area 903 and the registered-point tab area 702 partially overlap, and a tab area displayed on top is switched in response to a clicking operation performed by a user. In the above-described step 1132, the related point tab area 903 is displayed on top.

In step 1136, via-point editing is performed in accordance with editing operations performed by the user until via-points are determined by clicking an apply button 708 in the via-point editing area 705 (step 1138).

If the operation of determining via-points is performed (step 1138), a point database update routine, which will be described later, is called (step 1140) and the point database 107 is updated. The point coordinates indicated by the point location information described in the point record of the destination specified in the via-point editing area 705 in the via-point determination process and the point coordinates indicated by the point location information of each via-point are respectively recorded in the destination data 302 and the via-point data of the via-point list 303 (step 1142), and the process is ended.

The details of the via-point editing process and specific examples of the operation performed by a user to set the destination and via-points in the destination setting process are described below.

The process is described for the case in which points detected in the searching process performed in accordance with the search condition specified by the user include a point having valid related point data in a corresponding point record. In the case in which the point record of any point detected in the searching process performed in accordance with the search condition specified by the user includes no valid related point data, the process is performed in a similar manner as described earlier with reference to FIGS. 7 and 8.

First, as shown in FIG. 12A, the destination setting window 701 is displayed, and a list of point names of detected points A to F is displayed in the registered point tab area 702 wherein the point A at the top is set as the selected point and the point name thereof is highlighted. Herein, if points A, D, and F are points whose point record includes valid related point data, the point names of those points are displayed together with marks 1201 indicating that those points have valid related point data.

In this case, the point A currently set as the selected points has valid related point data recorded in the point record of the point A, and thus point names of points X, Y, and Z recorded in the related point data of the point record of the point A are displayed in the related point display area 1202 in descending order of relation level such that a point having a highest relation level is displayed at the top.

In this state, if the user moves the pin-shaped cursor 704 to the point D, then as shown in FIG. 12B, the point D is set as the selected point and the point name thereof is highlighted. Because the point D also has valid related point data recorded in the point record of the point D, point names of points P, Q, and R recorded in the related point data of the point record of the point D are displayed in the related point display area 1202 in descending order of relation level such that a point having a highest relation level is displayed at the top.

In this state, if the user clicks the apply button 703, then as shown in FIG. 12C, the via-point editing area 705 is displayed, and the point name 706 of the point D specified as the selected point is displayed as the destination point in the via-point editing area 705. Furthermore, a dummy point is displayed as a start point 707.

The related point tab area 903 is also displayed, and point names of points P, Q, and R recorded in the related point data of the point record of the point D are displayed in the related point tab area 903 in descending order of relation level such that a point having a highest relation level is displayed at the top. Note that, at this stage, the related point tab area 903 is displayed on top, and the point names displayed in the registered point tab area 702 are hidden behind the related point tab area 903.

In this state, the via-point editing process is started. When the via-point editing process is started, the start point 707 is set as an editing point, and the start point 707 is highlighted.

Figure 12D:
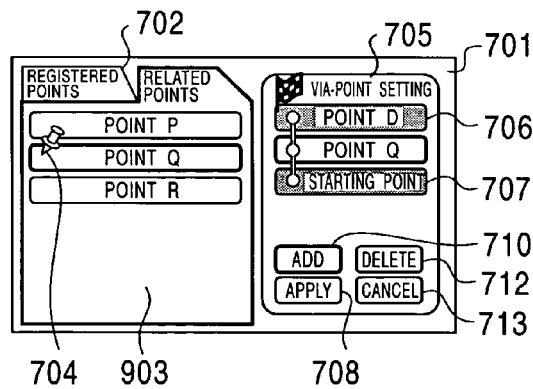
Figure 12E:
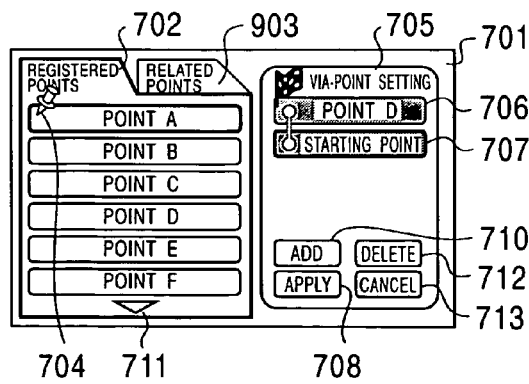
Figure 12F:
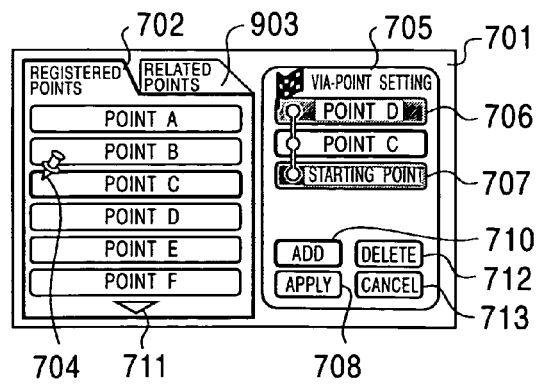

In the via-point editing process, when the related point tab area 903 is displayed on top as shown in FIGS. 12C and 12D, if the tab of the registered point tab area 702 is clicked by the user, then the registered point tab area 702 comes to the top as shown in FIG. 12E or 12F. Conversely, when the registered point tab area 702 is displayed on top as shown in FIG. 12E or 12F, if the tab of the related point tab area 903 is clicked by the user, then the related point tab area 903 comes to the top as shown in FIG. 12C or 12D.

In the via-point editing process in the state in which the related point tab area 903 is displayed on top as shown in FIG. 12C, a point selected in the related point tab area 903 as shown in FIG. 12D can be added as a via-point to the via-point editing area 705, and a via-point can be deleted from the via-point editing area 705 in response to an operation performed by the user in a similar manner as described above with reference to FIGS. 7 and 8 except that the registered point tab area 702 is replaced with the related point tab area 903. In the via-point editing process in the state in which the registered point tab area 702 is displayed on top as shown in FIG. 12E, a point selected in the registered point tab area 702 as shown in FIG. 12F can be added as a via-point to the via-point editing area 705, and a via-point can be deleted from the via-point editing area 705 in response to an operation performed by the user in a similar manner as described above with reference to FIGS. 7 and 8.

If the apply button 708 in the via-point editing area 705 is clicked, then in step 1142 in FIG. 11, point coordinates indicated by the point location information recorded in the point record of the point whose point name is displayed as the destination in the via-point editing area 705 are stored in the destination point data 302, and point coordinates indicated by the point location information recorded in the point record of each point whose point name is displayed as a via-point in the via-point editing area 705 are stored in passing-through order in the via-point data of the via-point list 303. Thereafter, a navigation route to the destination point set in the destination point data 302 through the respective via-points set in the via-point data is searched for. A detected navigation route is displayed on the display, for example, in a manner as show in FIG. 5, and route navigation along the detected navigation route is started.

The details of the routine, in step 1140 in FIG. 11, of updating the point database according to the second embodiment are described below with reference to a flow chart shown in FIG. 13.

Figure 13:
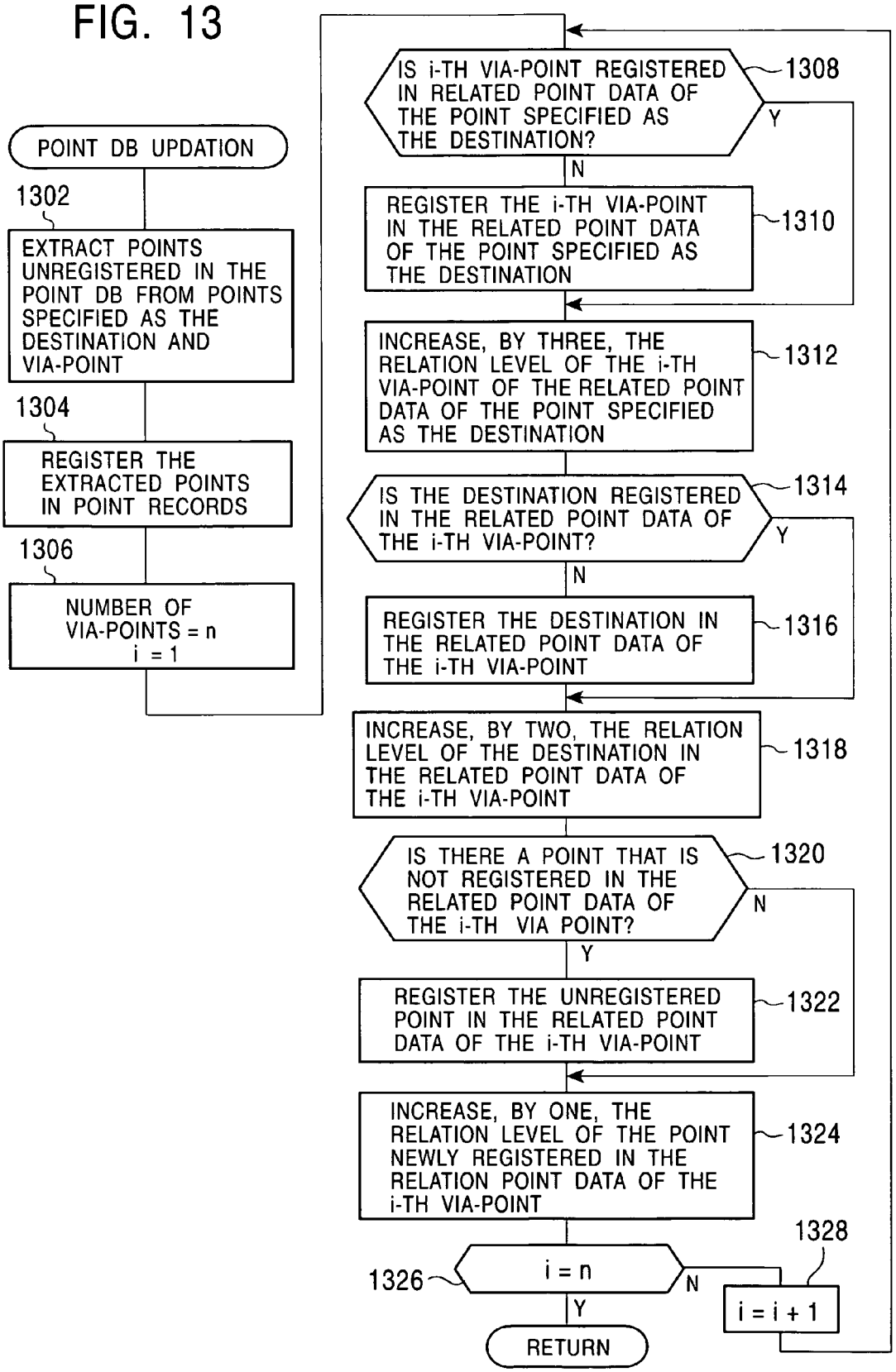
FIG. 13 is a flow chart showing a process of updating the point database according to the second embodiment of the present invention.

In this point database update routine, as shown in FIG. 13, it is determined whether all points whose point name is displayed as the destination or a via-point in the via-point editing area 705 are registered in the point database 107. If a point that is not registered in the point database 107 is detected (1302), a point record of the detected point is created in the point database 107 (step 1304), and a point number, a point type, a point name, point information, and point location information are recorded in the created point record. In the process of recording the information into the point record, information recorded in a preset point record corresponding to the point is used.

Thereafter, the points whose point name is currently displayed as a via-point in the via-point editing area 705 are set as via-points, and the following process is performed for each via-point (steps 1306, 1326, and 1328).

That is, for via-points whose point number is not registered in the related point data of the point record of the destination, point numbers of such via-points are registered in the related point data of the point record of the destination and the relation level thereof is set to 0 (steps 1308 and 1310). On the other hand, for via-points whose point number is registered in the related point data of the point record of the destination, the relation level thereof is increased by 3 (step 1312).

In the case in which the point number of the point selected as the destination is not registered in the related point data of a point record of a via-point, the point number of the destination is recorded in the related point data of the point record of that via-point, and the relation level thereof is set to 0 (steps 1314 and 1316), and furthermore the relation level of a point specified as the destination and already registered in the related point data of the point record of that via-point is increased by 2 (step S1318).

In the case in which, of via-points, for example, the point number of a via-point A is not registered in the related point data of another via-point, for example, a via-point B, then the point number of the via-point A is registered in the related point data of the point record of the via-point B and the relation level thereof is set to 0 (steps 1320 and 1322). Furthermore, the relation level of each via-point already registered in the related point data of another via-point is increased by 1 (step 1324).

Thus, after completion of setting of the destination and via-points through the point database update process described above, the relation level of each via-point to the destination increases by 3, the relation level of the destination to the respective via-points increases by 2, and the relation level of each via-point to another via-point increases by 1.

When a user sets a destination and one or more via-points at an arbitrary time after that, if a point is selected as a destination, points related to the point selected as the destination are presented to the user as candidates for via-points in the order of the relation level. Points selected in the past by a user as a destination or via-points for a single route have relations with one another, and those points have a high probability that those points are selected together again. Thus, presenting of those points to a user according to the second embodiment makes it possible for the user to easily make a correct setting in terms of the destination and via-points.

The second embodiment of the present invention has been described above.

In the embodiments described above, a destination selected by a user is first accepted, and points related to the point accepted as the destination are presented to the user. The user then selects one or more points as via-points from the presented points. Alternatively, a via-point selected by a user may be first accepted, and points related to the point accepted as the via-point may be presented to the user so that the user can select a destination and/or via-points from the presented points. Still alternatively, when a point is selected by a user, the selected point and points related to the selected point are presented to the user so that the user can select a destination and/or via-points from the presented points.

What is claimed is:

1. A navigation apparatus for, in accordance with a destination and one or more via-points specified by a user, searching for a route to the specified destination through the specified one or more via-points and presenting a detected route, comprising:
a point database in which a plurality of point combinations are recorded, each combination comprising a previously set destination point that is a point specified as a destination in the past by a user and one or more previously set via-points that are points that were specified as via-points to the previously set destination point;
a destination acceptance unit for accepting a point entered by the user as the destination; and
a via-point acceptance unit for accepting one or more via-points, wherein if the point accepted as the destination by the destination acceptance unit is included as a previously set destination point in the combinations of previously set destination points and via-points that are recorded in the point database, then previously set via-points included in the combinations having a matching destination are presented to the user as candidate via-points, and via-points specified by the user from the presented via-point candidates are accepted by the via-point acceptance unit as the one or more via-points.

2. A navigation apparatus according to claim 1, wherein the destination acceptance unit includes:
a previously set via-point presentation unit for displaying a previously set via-point list such that when a point is selected by the user as a destination from a registered point list which is a list of a plurality of points registered in advance, if the selected point is included as a previously set destination point in a combination recorded in the point database, then one or more previously set via-points included in that combination are displayed as the previously set via-point list; and
a point selection acceptance unit for accepting a point such that if a point is selected by the user from the presented registered point list, the selected point is accepted as the destination specified by the user.

3. A navigation apparatus for, in accordance with a destination and one or more via-points specified by a user, searching for a route to the specified destination through the specified one or more via-points and presenting a detected route, comprising:
a point database in which a plurality of points and relations among those points are recorded, where a recorded relation between points in the point database indicates the frequency of occurrence of the points having been specified previously as a destination and an associated via-point;
a destination acceptance unit for accepting a point as a current destination when the user enters the point as the destination; and
a via-point acceptance unit for accepting a point as a candidate for a via-point if the relation of said point to the point accepted as the current destination by the destination acceptance unit is recorded in the point database to indicate the points have been specified previously as a destination and an associated via-point;
wherein the navigation apparatus further comprises a via-point setting unit for presenting, to the user, one or more candidates for via-points accepted by the via-point acceptance unit, accepting one or more points selected by the user from the presented candidates for via-points, and setting the accepted one or more points as via-points specified by the user in association with the current destination.

4. A navigation apparatus according to claim 3, further comprising a point database update unit for updating the point database such that when a destination and one or more via-points are specified by the user, relations of the points specified as the via-points to the point specified as the destination are recorded in the point database,
wherein the via-point acceptance unit accepts a point as a candidate for a via-point if the relation of said point to the point accepted as the destination by the destination acceptance unit is recorded in the point database.

5. A navigation apparatus according to claim 3, further comprising a point database update unit for updating the point database such that when a destination and one or more via-points are specified by the user, a correlation between the point specified as the destination and each point specified as a via-point is recorded in the point database.

6. A navigation apparatus according to claim 5, wherein the point database update unit updates the point database such that when a destination and a plurality of via-points are specified by the user, relations among the points specified as the via-points are recorded in the point database.

7. A navigation apparatus according to claim 3, wherein the via-point acceptance unit accepts a point as a candidate for a via-point if the relation of said point to the point accepted as the destination by the destination acceptance unit is recorded in the point database, and wherein the navigation apparatus further comprises:
- a via-point editing unit for presenting, to the user, candidates for via-points accepted by the via-point acceptance unit, and performing editing including at least addition and/or deletion of a candidate for a via-point in accordance with an editing operation performed by the user; and
- a via-point setting unit for setting a via-point such that when a via-point decision operation is performed by the user, one or more points, which are presented as candidates for via-points at the time at which the via-point decision operation is performed, are set as via-points.

8. A navigation apparatus according to claim 3, wherein the destination acceptance unit includes:
- a related point presentation unit for presenting a recorded point list which is a list of points recorded in the point database, and presenting a related point list which is a list of points whose relation to a point selected by the user from the recorded point list is recorded in the point database; and
- a point selection acceptance unit for accepting a point such that if a point is selected by the user from the presented registered point list, the selected point is accepted as the destination specified by the user.

9. A navigation apparatus according to claim 3, wherein relation levels among the plurality of points are recorded in the point database, and the via-point acceptance unit accepts a point as a candidate for a via-point if the relation of said point to the point accepted as the destination by the destination acceptance unit is recorded in the point database, and wherein the navigation apparatus further comprises:
- a point database update unit for updating the point database such that when a destination and one or more via-points are specified by the user, the relation level of the point specified as the destination to each point specified as a via-point is increased; and
- a via-point setting unit for setting one or more via-points such that candidates for via-points accepted by the via-point acceptance unit are presented to the user in the form of a list arranged in descending order of level of relation to a point accepted as a destination by the destination acceptance unit, and one or more points selected by the user from the presented candidates for via-points are accepted and set as via-points specified by the user.

10. A method, in a navigation apparatus for searching for a route to a destination specified by a user through one or more via-points specified by the user and presenting a detected route, for specifying a point as a destination of a route to be navigated or a via-point on the route, the method comprising:
- accepting a point entered by a user as a current point of interest from points recorded in a point database in which a plurality of points and relations among the plurality of points are recorded, where a recorded relation between points in the point database indicates the frequency of occurrence of the points having been specified previously as a destination and an associated via-point;
- presenting, as a candidate for a via-point, a point whose relation to the point accepted as the current point of interest is recorded in the point database to indicate the points have been specified previously as a destination and an associated via-point; and
- setting one or more via-points on the route such that one or more points selected as via-points from the presented candidate points are accepted, and the accepted one or more points are set as the via-points.

11. A method according to claim 10, further comprising:
- updating the point database such that when a destination and one or more via-points are specified by the user, the relation of each point specified as a via-point to the point specified as the destination is recorded in the point database,
- wherein in the presentation act, each point whose relation to a point accepted as a selected point of interest is recorded in the point database is presented as a candidate point to the user, and
- in the setting act, the point of interest is set as the destination, and one or more points selected as via-points from presented candidate points are accepted and set as via-points.

12. A method according to claim 10, further comprising:
- updating the point database such that when a destination and one or more via-points are specified by the user, a correlation between the point specified as the destination and each point specified as a via-point is recorded in the point database.

13. A computer program that is read and executed by a computer, the program causing the computer to execute the acts of:
- in accordance with a destination and one or more via-points specified by a user, searching for a route to the specified destination through the specified one or more via-points and presenting a detected route;
- accepting a point entered by the user as a current point of interest from points recorded in a point database in which a plurality of points and relations among the plurality of points are recorded, where a recorded relation between points in the point database indicates the frequency of occurrence of the points having been specified previously as a destination and an associated via-point;
- presenting, as a candidate for a via-point, a point whose relation to the point accepted as the current point of interest is recorded in the point database to indicate the points have been specified previously as a destination and an associated via-point; and
- setting one or more via-points on the route such that one or more points selected as via-points from presented candidate points are accepted, and the accepted one or more points are set as the via-points.

14. A computer program according to claim 13, for causing the computer to further execute the act of updating the point database such that when a destination and one or more via-points are specified by the user, the relation of each point specified as a via-point to the point specified as the destination is recorded in the point database,
- wherein in the presentation act, each point whose relation to a point accepted as a selected point of interest is recorded in the point database is presented as a candidate point to the user, and
- in the setting act, the point of interest is set as the destination, and one or more points selected as via-points from presented candidate points are accepted and set as via-points.

15. A computer program according to claim 13, for causing the computer to further execute the act of updating the point database such that when a destination and one or more via-points are specified by the user, a correlation between the point specified as the destination and each point specified as a via-point is recorded in the point database.

16. A storage medium on which a computer program that is read and executed by a computer is stored, the computer program causing the computer to execute the acts of:

in accordance with a destination and one or more via-points specified by a user, searching for a route to the specified destination through the specified one or more via-points and presenting a detected route;

accepting a point entered by the user as a current point of interest from points recorded in a point database in which a plurality of points and relations among the plurality of points are recorded, where a recorded relation between points in the point database indicates the frequency of occurrence of the points having been specified previously as a destination and an associated via-point;

presenting, as a candidate for a via-point, a point whose relation to the point accepted as the current point of interest is recorded in the point database to indicate the points have been specified previously as a destination and an associated via-point; and setting one or more via-points on the route such that one or more points selected as via-points from presented candidate points are accepted and the accepted one or more points are set as the via-points.

* * * * *